US009477362B2

(12) United States Patent
Ono et al.

(10) Patent No.: US 9,477,362 B2
(45) Date of Patent: Oct. 25, 2016

(54) TOUCH SCREEN COVERED WITH WIRING PATTERN HAVING FIRST AND SECOND LAYERS

(71) Applicant: MITSUBISHI ELECTRIC CORPORATION, Chiyoda-ku (JP)

(72) Inventors: Takeshi Ono, Tokyo (JP); Naoki Nakagawa, Tokyo (JP); Masafumi Agari, Tokyo (JP); Takahiro Nishioka, Tokyo (JP); Seiichiro Mori, Tokyo (JP); Takashi Miyayama, Tokyo (JP); Takuji Imamura, Tokyo (JP); Tatsuya Nakamura, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 17 days.

(21) Appl. No.: 14/427,080

(22) PCT Filed: Aug. 2, 2013

(86) PCT No.: PCT/JP2013/070969
§ 371 (c)(1),
(2) Date: Mar. 10, 2015

(87) PCT Pub. No.: WO2014/050306
PCT Pub. Date: Apr. 3, 2014

(65) Prior Publication Data
US 2015/0242013 A1 Aug. 27, 2015

(30) Foreign Application Priority Data
Sep. 26, 2012 (JP) ................................ 2012-211754

(51) Int. Cl.
*G06F 3/044* (2006.01)
*G06F 1/16* (2006.01)

(52) U.S. Cl.
CPC ................. *G06F 3/044* (2013.01); *G06F 1/16* (2013.01); *G06F 2203/04111* (2013.01); *G06F 2203/04112* (2013.01)

(58) Field of Classification Search
CPC ........... G06F 1/16; G06F 2203/04111; G06F 2203/04112; G06F 3/044
See application file for complete search history.

(56) References Cited

U.S. PATENT DOCUMENTS

| 6,452,514 B1 | 9/2002 | Philipp |
| 8,462,129 B2 | 6/2013 | Miyayama et al. |

(Continued)

FOREIGN PATENT DOCUMENTS

| JP | 2003-526831 A | 9/2003 |
| JP | 2010-277392 A | 12/2010 |

(Continued)

OTHER PUBLICATIONS

International Search Report issued Aug. 27, 2013 in PCT/JP2013/070969 filed Aug. 2, 2013.

*Primary Examiner* — Andrew Sasinowski
*Assistant Examiner* — Chun-Nan Lin
(74) *Attorney, Agent, or Firm* — Oblon, McClelland, Maier & Neustadt, L.L.P.

(57) ABSTRACT

A touch screen according to a disclosed embodiment may have a small cross capacitance between row-direction wiring and column-direction wiring, and a large change of the cross capacitance when the touch screen is touched by an indication body. A row-direction wiring includes a first portion and a second portion having a smaller wiring width than a wiring width of the first portion. A wiring width of the column-direction wiring is smaller than a length in a row direction of the second portion. The row-direction and column-direction wiring intersect in the second portion, and gaps are formed between the row-direction and column-direction wiring in planar view in an intersection portion. The touch screen further includes floating wiring that fills the gaps in planar view, and the floating wiring is formed in the same layer as the row-direction wiring or the column-direction wiring, and is insulated from both wirings.

7 Claims, 21 Drawing Sheets

(56) References Cited

U.S. PATENT DOCUMENTS

| | | | |
|---|---|---|---|
| 2013/0222325 A1* | 8/2013 | Cok | G06F 3/044 345/174 |
| 2013/0242485 A1 | 9/2013 | Ohtani et al. | |
| 2013/0327560 A1* | 12/2013 | Ichiki | G06F 3/044 174/133 R |
| 2014/0063374 A1* | 3/2014 | Kuriki | G06F 3/044 349/12 |
| 2015/0002464 A1 | 1/2015 | Nishioka et al. | |

FOREIGN PATENT DOCUMENTS

| | | | | |
|---|---|---|---|---|
| JP | 2011-175628 A | 9/2011 | | |
| JP | 2012-103761 A | 5/2012 | | |
| JP | WO 2012157555 | * 11/2012 | | G06F 3/044 |
| JP | 2012-238274 | 12/2012 | | |
| WO | 00/44018 | 7/2000 | | |
| WO | 2012-115091 A1 | 8/2012 | | |
| WO | 2013/133026 A1 | 9/2013 | | |

* cited by examiner

F I G . 5
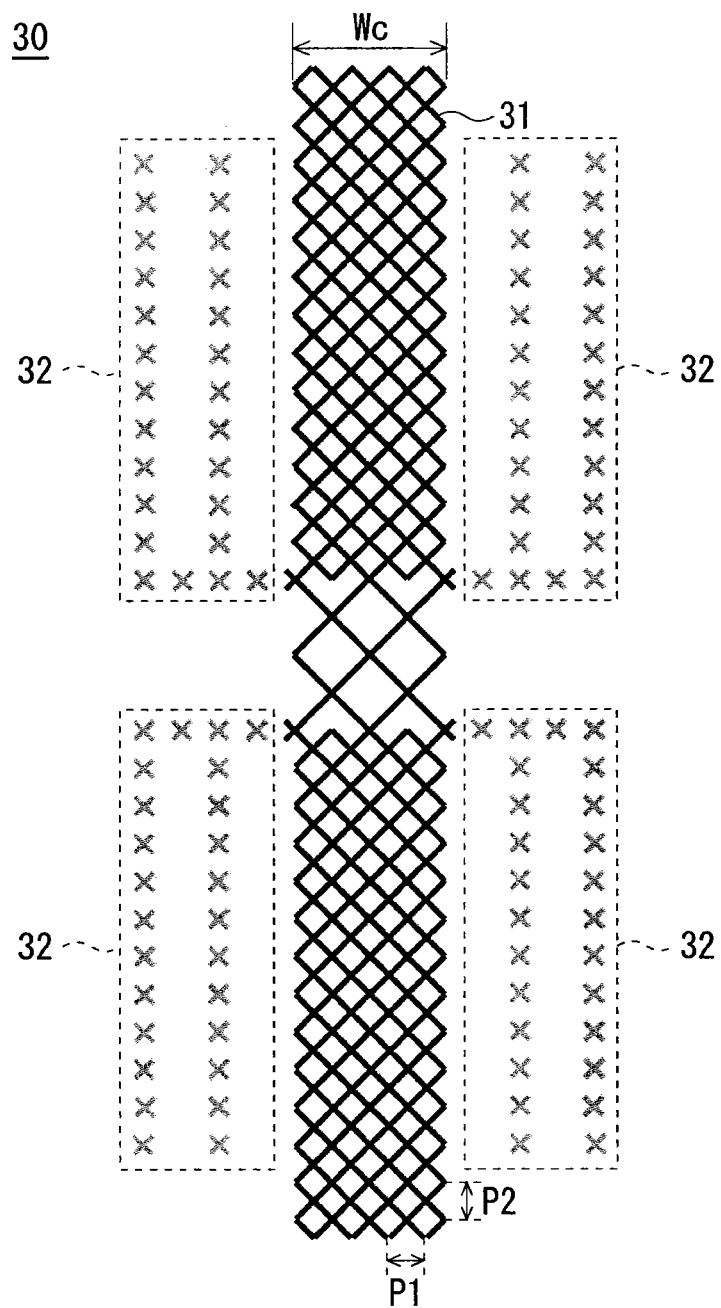

F I G . 7
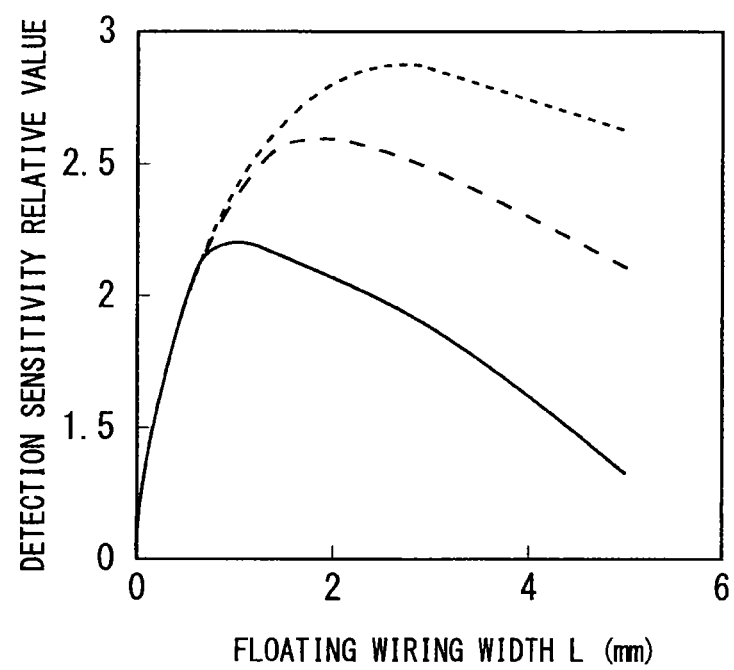

F I G . 9
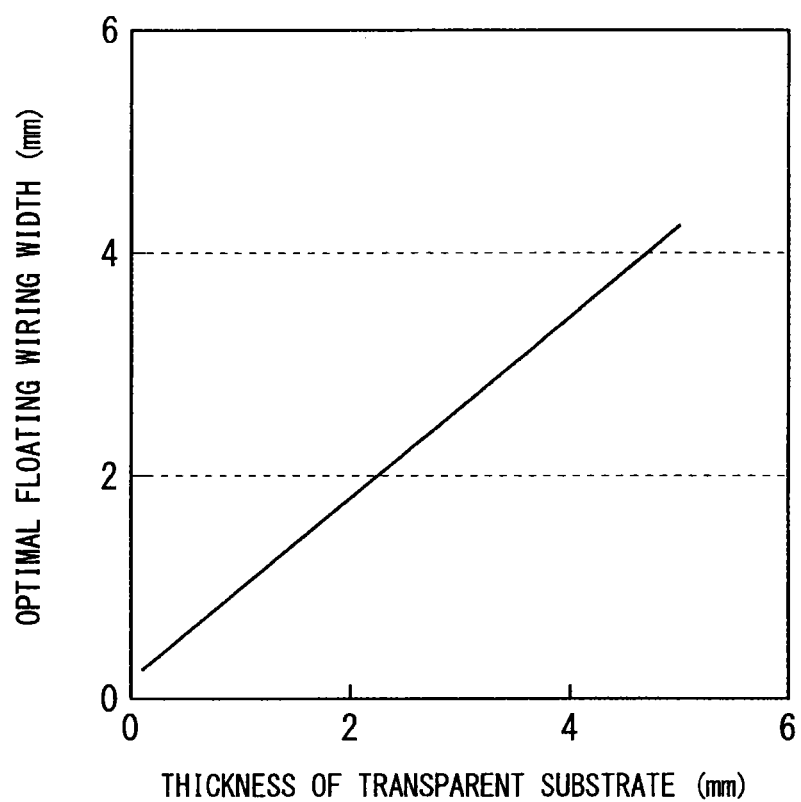

F I G. 1 0

| CONDITION OF DISCONNECTION PORTION | WHEN DISCONNECTION PORTION IS NOT PROVIDED | WHEN ONE DISCONNECTION PORTION EXTENDING IN COLUMN DIRECTION IS PROVIDED | WHEN THREE DISCONNECTION PORTIONS EXTENDING IN COLUMN DIRECTION ARE PROVIDED | WHEN ONE DISCONNECTION PORTION EXTENDING IN ROW DIRECTION IS PROVIDED | WHEN THREE DISCONNECTION PORTIONS EXTENDING IN ROW DIRECTION ARE PROVIDED | WHEN TEN DISCONNECTION PORTIONS EXTENDING IN COLUMN DIRECTION ARE PROVIDED |
|---|---|---|---|---|---|---|
| RELATIVE VALUE OF INTER-WIRING CAPACITANCE | 1.00 | 0.52 | 0.28 | 1.00 | 0.98 | 0.89 |

F I G . 1 4
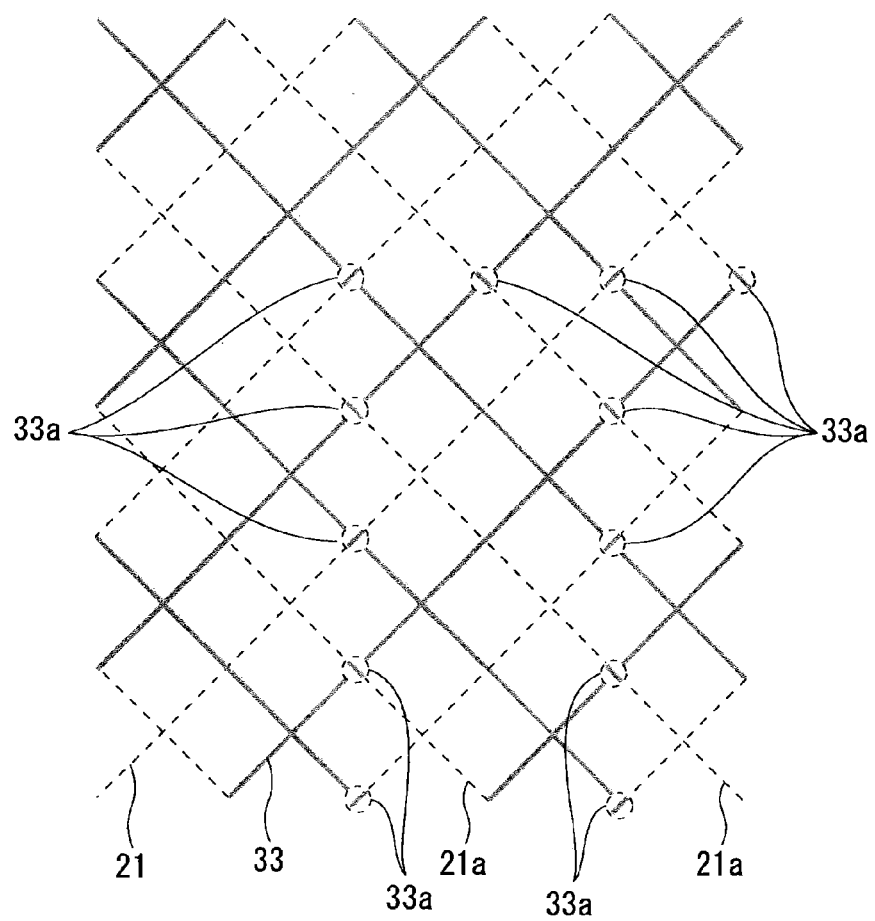

F I G . 1 8
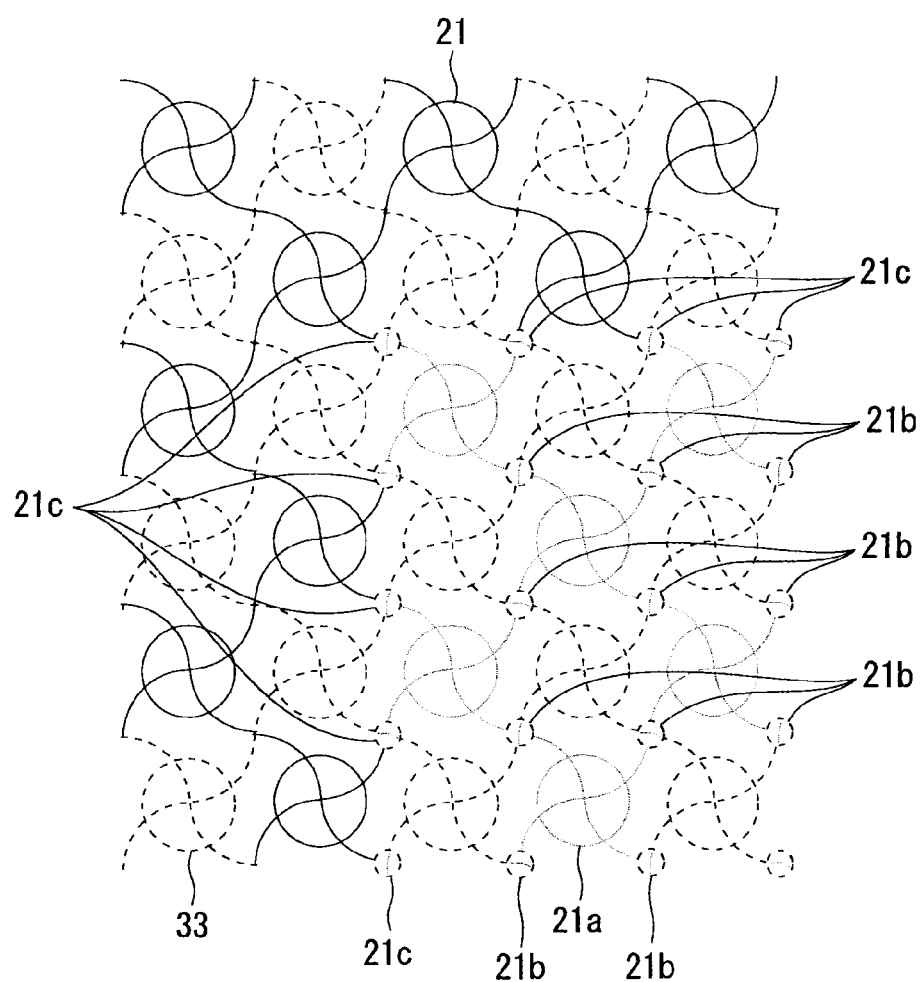

TOUCH SCREEN COVERED WITH WIRING PATTERN HAVING FIRST AND SECOND LAYERS

TECHNICAL FIELD

The present invention relates to a touch screen.

BACKGROUND ART

A touch panel is a device that detects touch with a finger or the like to specify position coordinates of a position where the touch panel is touched. The touch panel has attracted attention as excellent user interface means. Various types of touch panels such as a resistance film type, an electrostatic capacitive type and the like have been produced.

Generally, the tough panel is made up of a touch screen incorporating a touch sensor, and a detection device that specifies position coordinates where the touch panel is touched, based on a signal from the touch screen.

As one of the electrostatic capacitive type touch panels, there is a projected capacitive type touch panel (e.g., refer to Patent Document 1).

The projected capacitive type touch panel can detect touch even when a front surface side of the touch screen where the touch sensor is incorporated is covered with a protective plate such as a glass plate having a thickness of about several millimeters.

This type of touch panel is excellent in robustness, because the protective plate can be arranged in a front surface. Moreover, the detection of touch is enabled when gloves are worn. In addition, since it has no movable portion, it has a long service life.

The projected capacitive type touch panel generally includes a plurality of row-direction wirings provided so as to extend in a row direction, which configures a first electrode, and a plurality of column-direction wirings provided so as to extend in a column direction, which configures a second electrode. A field change between the row-direction wiring and the column-direction wiring, that is, a change in an inter-wiring capacitance of the row-direction wiring and the column-direction wiring (hereinafter, simply referred to as an inter-wiring capacitance) is detected to thereby specify position coordinates where the touch panel is touched. This detection method is generally called a mutual capacitance detection method (e.g., refer to Patent Document 2).

Moreover, when the touch screen is attached to a display device, a display area of the display device is covered with the row-direction wiring and the column-direction wiring included in the touch screen. In accordance with the arrangement of the wirings, transmission of display light becomes ununiform, or a reflectivity of outside light becomes ununiform, which may cause a moire phenomenon, or may allow wirings to be visually recognized. In order to provide high-quality pictures to a user, a touch screen of which existence is difficult for the user to feel, such as a touch screen in which wirings are difficult to be visually recognized, is more preferable.

PRIOR ART DOCUMENTS

Patent Documents

Patent Document 1: Japanese Patent Application Laid-Open No. 2012-103761

Patent Document 2: Japanese Unexamined Patent Application Publication (Translation of PCT Application) No. 2003-526831

SUMMARY OF INVENTION

Problems to be Solved by the Invention

In the above-described projected capacitive type touch panel, there is a problem that if electric field coupling between the first electrode and the second electrode is large, a change of the inter-wiring capacitance is not likely to be caused when an indication body such as a finger touches the touch panel, so that large detection sensitivity cannot be assured. If the detection sensitivity is made small, misdetection is easily caused.

The present invention is achieved in order to solve the above-described problems, and an object of the present invention is to provide a touch screen in which an inter-wiring capacitance between row-direction wiring and column-direction wiring is small, and a change of the inter-wiring capacitance when the touch screen is touched by an indication body is large. Moreover, to provide a touch screen in which visibility is enhanced is a secondary object.

Means for Solving the Problems

A touch screen according to the present invention is a touch screen covered with a mesh-like wiring pattern including upper and lower two layers including row-direction wiring and column-direction wiring, wherein the row-direction wiring includes a first portion and a second portion having a wiring width smaller than a wiring width of the first portion, a wiring width of the column-direction wiring is smaller than a length in a row direction of the second portion of the row-direction wiring, the row-direction wiring and the column-direction wiring intersect in the second portion of the row-direction wiring, gaps are formed between the row-direction wiring and the column-direction wiring in planar view in an intersection portion of the row-direction wiring and the column-direction wiring, the touch screen further includes floating wiring that fills the gaps in planar view, the floating wiring is formed in the same layer as the row-direction wiring or the column-direction wiring, and the floating wiring is insulated from the row-direction wiring and the column-direction wiring.

Effects of the Invention

According to the present invention, providing the floating wiring enables the gaps each having a width of the floating wiring to be provided between the row-direction wiring and the column-direction wiring without degrading visibility. Thus, providing the floating wiring can reduce the inter-wiring capacitance between the row-direction wiring and the column-direction wiring. Furthermore, a change amount of the inter-wiring capacitance when the touch screen is touched can be increased. Thus, touch detection sensitivity can be enhanced, as compared with a case where the floating wiring is not provided.

The objects, characteristics, aspects and advantages of the present invention will be made more apparent by the following detailed description and the accompanying drawings.

BRIEF DESCRIPTION OF DRAWINGS

FIG. 5 is a plan view of an upper electrode of the touch screen according to the first embodiment.

FIG. 7 is a view showing a relationship between detection sensitivity and a floating wiring width.

FIG. 9 is a view showing a relationship between an optimal floating wiring width and a thickness of a transparent substrate.

FIG. 10 is a view showing a relationship between a disconnection portion of floating wiring and a relative value of an inter-wiring capacitance.

FIG. 14 is an enlarged view of an area C in FIG. 13.

FIG. 18 is an enlarged view of an area D in FIG. 17.

DESCRIPTION OF EMBODIMENTS

First Embodiment

Configuration

First, referring to FIGS. 1 and 2, a layer structure of a touch screen 1 of the present embodiment will be described. The touch screen 1 in the present embodiment is a projected capacitive type touch screen.

Figure 1:
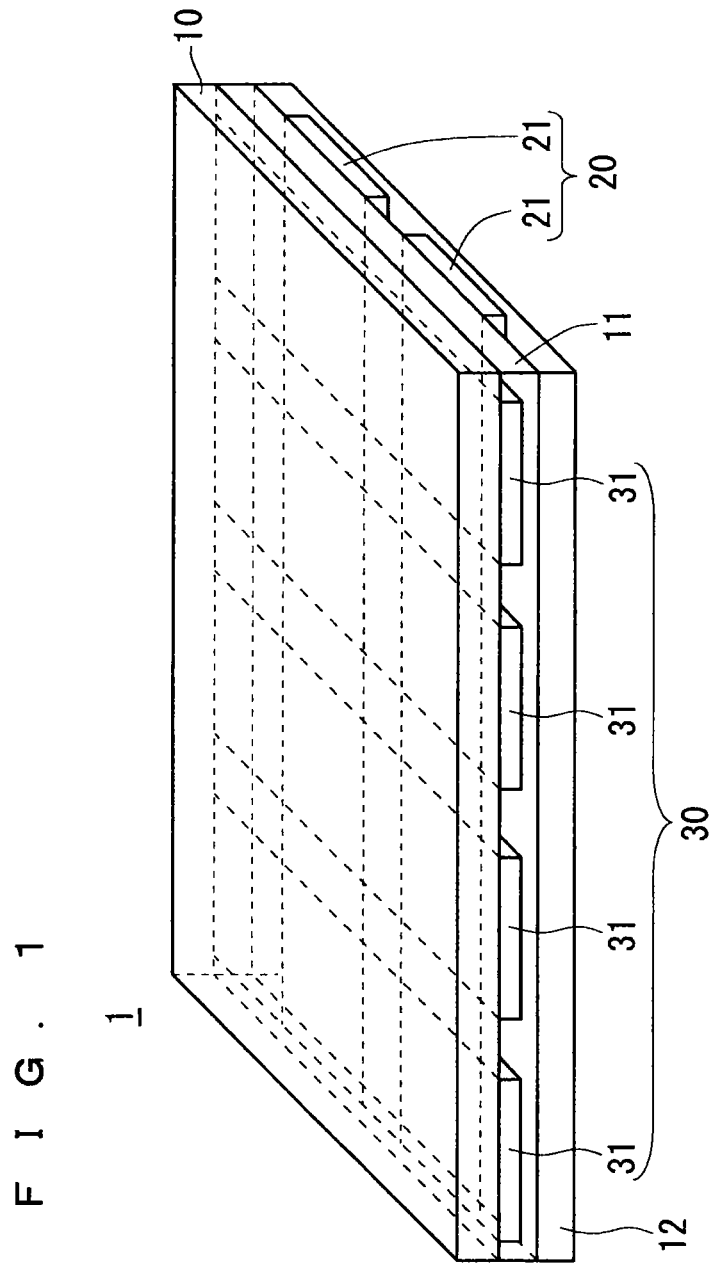
FIG. 1 is a perspective view of a touch screen according to a first embodiment.

FIG. 1 is a perspective view of the layer structure of the touch screen 1 of the present embodiment. An upper surface layer of the touch screen 1 is a transparent substrate 10 made of a transparent glass material or transparent resin. On a back surface of the transparent substrate 10, an upper electrode 30 is formed.

Moreover, in the back surface of the transparent substrate 10, an interlayer insulation film 11 is formed so as to cover the upper electrode 30. The interlayer insulation film 11 is a transparent insulation film such as a silicon nitride film, a silicon oxide film and the like. On a back surface of the interlayer insulation film 11, a lower electrode 20 is formed.

Moreover, in the back surface of the interlayer insulation film 11, a protective film 12 is formed so as to cover the lower electrode 20. The protective film 12 is an insulating film having translucency such as a silicon nitride film and the like, similar to the interlayer insulation film 11.

The upper electrode 30 includes a plurality of column-direction wirings 31 made of a transparent wiring material such as ITO (Indium Tin Oxide) and the like, or a metal wiring material such as aluminum and the like. Moreover, the lower electrode 20 includes a plurality of row-direction wirings 21 made of the same material as the column-direction wirings 31.

Figure 2:
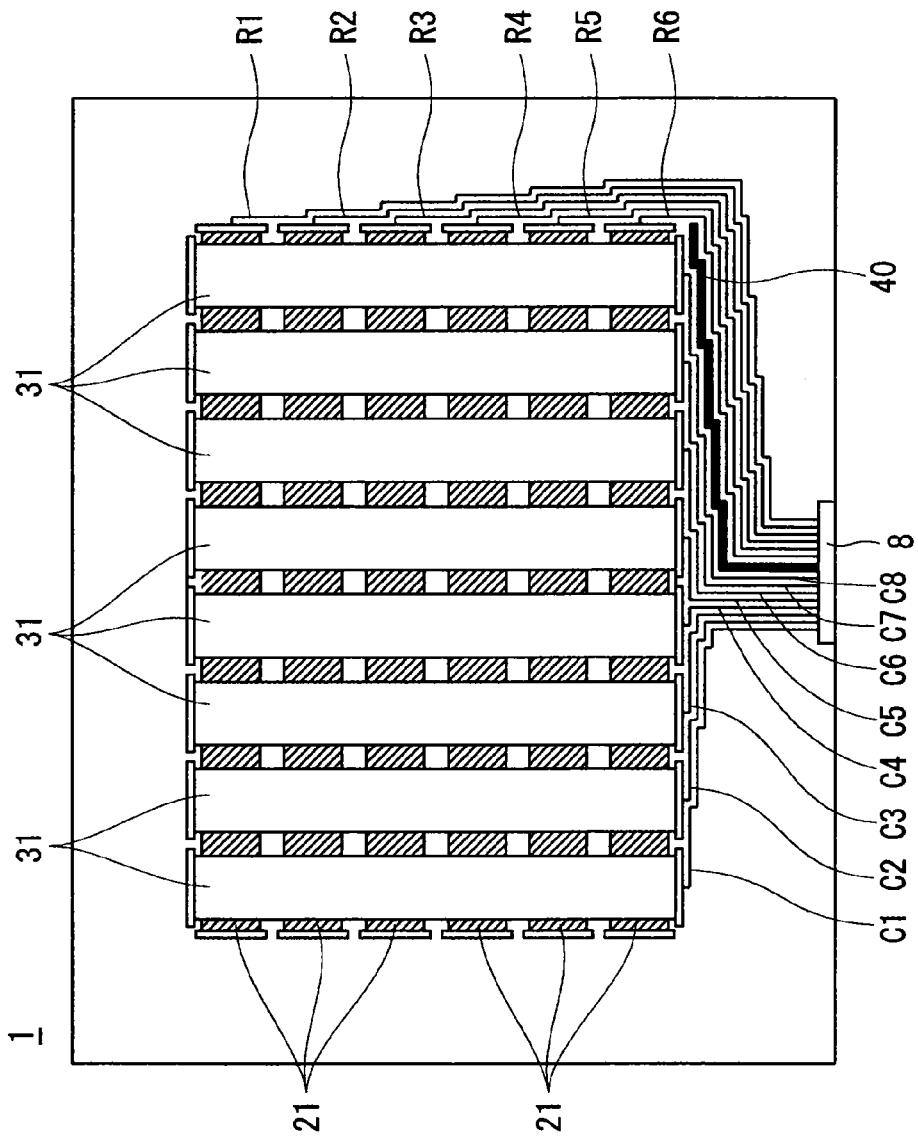
FIG. 2 is a plan view of the touch screen according to the first embodiment.

In FIGS. 1 and 2, for convenience of illustration, the column-direction wiring 31 and the row-direction wiring 21 are not shown so as to have a mesh-like structure as described later.

In the present embodiment, the column-direction wiring 31 and the row-direction wiring 21 each have a multilayer structure of an aluminum-based alloy layer and a nitride layer thereof. This can make a wiring resistance small and increase a transmittance of light in a detectable area.

Moreover, while the column-direction wiring 31 is arranged in an upper layer of the row-direction wiring 21, a positional relation thereof may be reversed, so that the row-direction wiring 21 is arranged in an upper layer of the column-direction wiring 31.

A user performs operation by touching the transparent substrate 10, which is a surface of the touch screen 1, with an indication body such as a finger and the like. When the indication body touches the transparent substrate 10, an inter-wiring capacitance between the row-direction wiring 21 and the column-direction wiring 31 under the transparent substrate 10 is changed. This capacitance change is detected, by which it can be specified at which position inside the detectable area the transparent substrate 10 is touched.

FIG. 2 is a plan view of the touch screen 1 of the present embodiment. The detectable area of the touch screen 1 is made up of the plurality of row-direction wirings 21 extending in a lateral direction (row direction), and the plurality of column-direction wirings 31 overlapping in planar view on a front side of the row-direction wirings 21 and extending in a longitudinal direction (column direction).

The respective row-direction wirings 21 are connected to a terminal 8 to be connected to outside wiring by lead lines R1 to R6. Moreover, the respective column-direction wirings 31 are similarly connected to the terminal 8 to be connected to the outside wiring by lead lines C1 to C8.

The lead lines R4, R5 are arranged along an outer circumference of the detectable area. Moreover, the lead lines R3, R6 are arranged along the outer circumference of the detectable area, and after reaching the lead line R4 or the lead line R5, they are arranged along the lead lines R4, R5. In this manner, the lead lines R1 to R6 are arranged close to an outer circumferential side of the detectable area. The lead lines C1 to C8 are also arranged close to the outer circumferential side of the detectable area in order from the lead line closest to the terminal 8.

Arranging the lead lines R1 to R6, C1 to C8 as close as possible to the outer circumferential side of the detectable area can suppress a fringe capacitance between the display device to which the touch screen 1 is attached, and lead wiring. Thus, the above-described arrangement of the lead wiring can reduce influence on the lead wiring by electromagnetic noise caused from the display device to which the touch screen 1 is attached.

Moreover, in a portion where the lead line C8 of the column-direction wiring 31 and the lead line R6 of the row-direction wiring 21 extend in parallel, dummy lead wiring 40 to which a reference potential of ground or the like is supplied is provided between the lead wirings.

Providing the dummy lead wiring 40 in this manner can largely reduce the inter-wiring capacitance between the lead line C8 and the lead line R6, and thus, even when the indication body such as a finger touches this portion, misdetection can be prevented.

Figure 3:
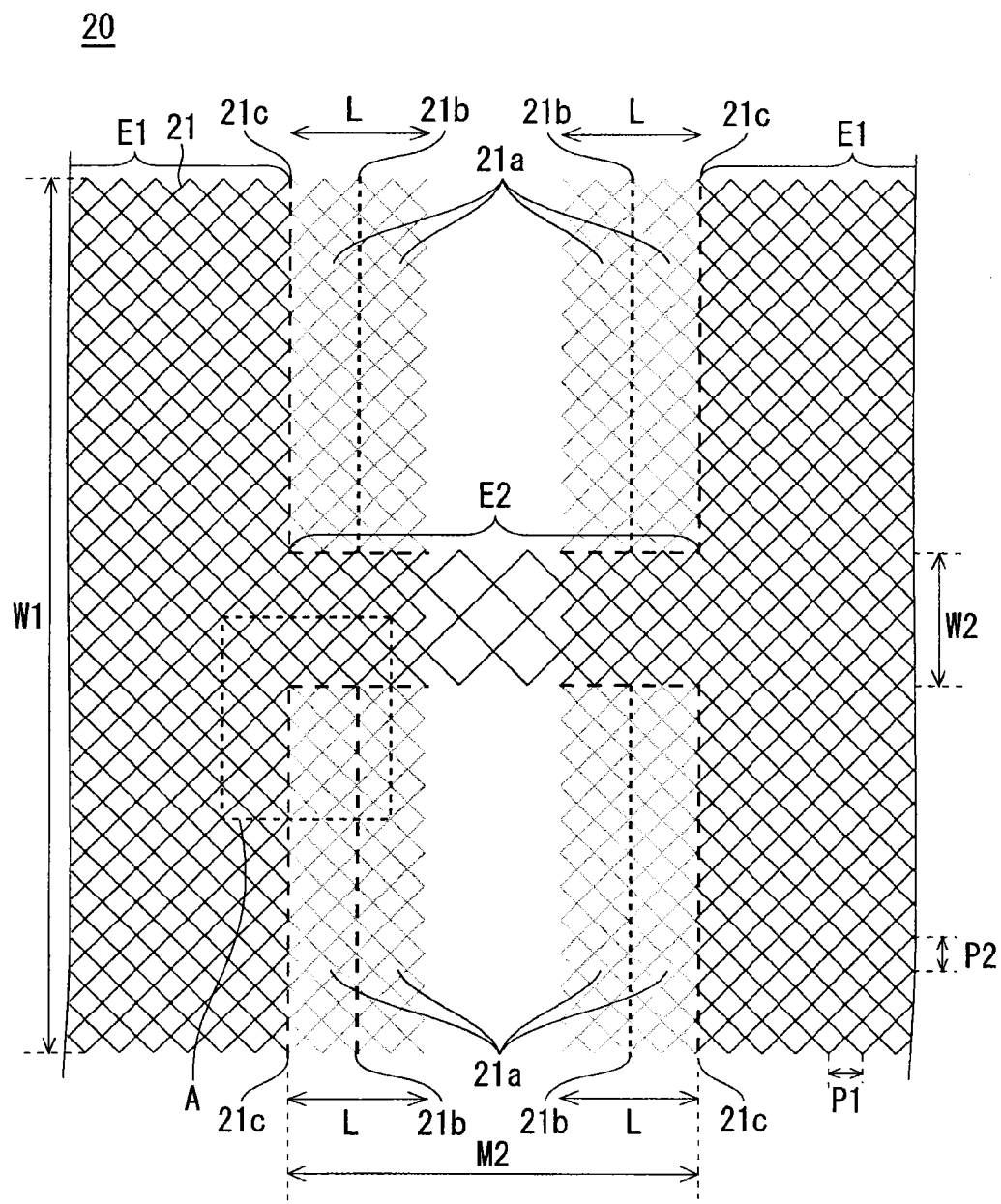
FIG. 3 is a plan view of a lower electrode of the touch screen according to the first embodiment.
Figure 4:
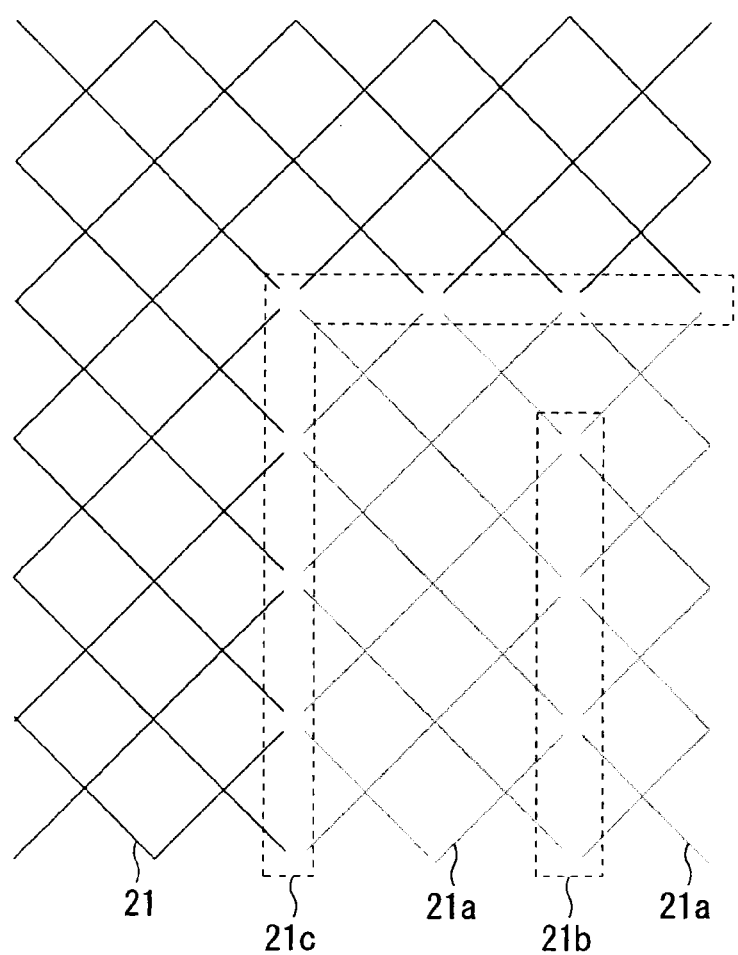
FIG. 4 is an enlarged view of an area A in FIG. 3.
Figure 6:
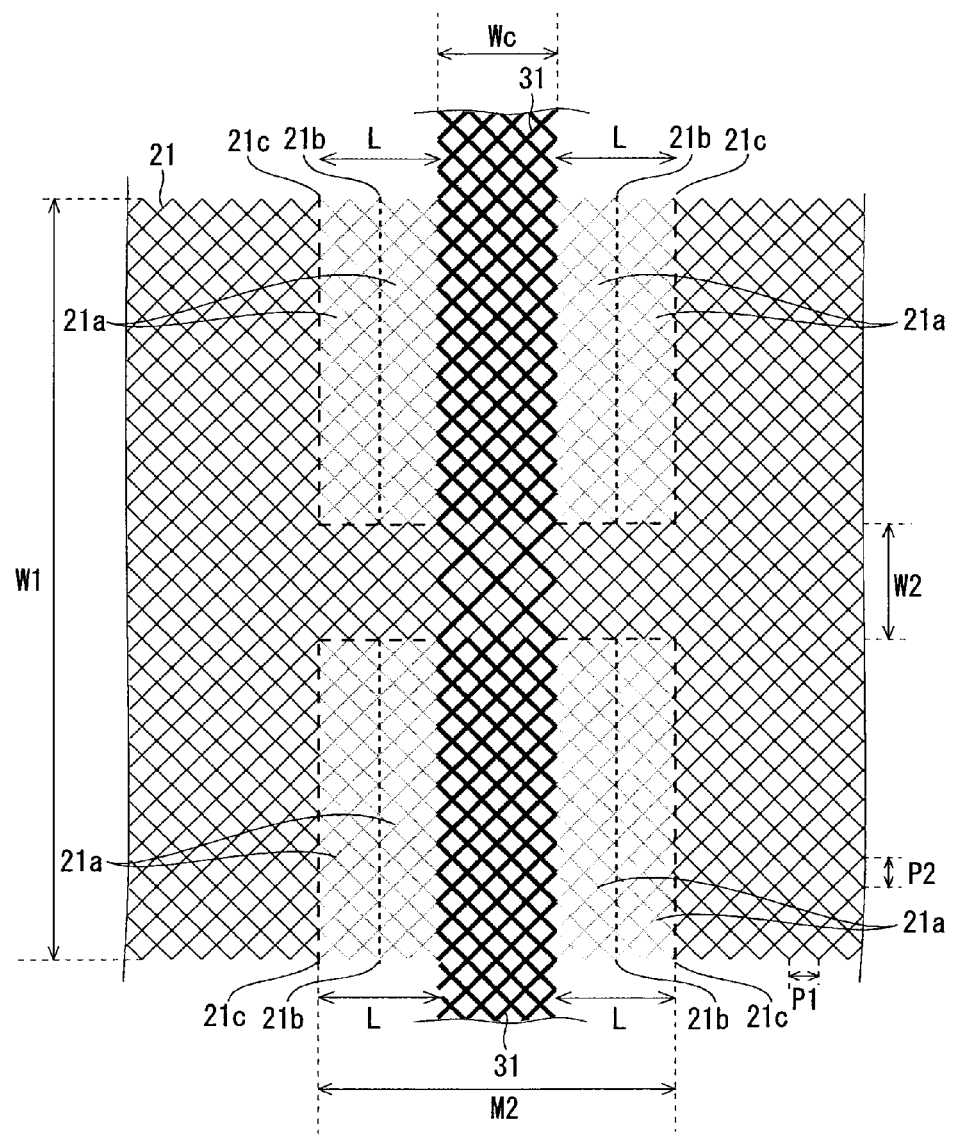
FIG. 6 is a plan view of the lower electrode and the upper electrode of the touch screen according to the first embodiment.

Next, referring to FIGS. 3 to 6, detailed structures of the row-direction wiring 21 and the column-direction wiring 31 will be described. FIG. 3 is a plan view of the lower electrode 20 in which a vicinity of an area where the row-direction wiring 21 and the column-direction wiring 31 overlap in planar view is enlarged. FIG. 4 is an enlarged view of an area A in FIG. 3. Moreover, FIG. 5 is a plan view of the upper electrode 30 in which a vicinity of the area where the row-direction wiring 21 and the column-direction wiring 31 overlap in planar view is enlarged. Moreover, FIG. 6 is a plan view of the area where the row-direction wiring 21 and the column-direction wiring 31 overlap in planar view. In FIGS. 3 to 6, a lateral direction is the row direction, and a longitudinal direction is the column direction. FIGS. 3 to 6 schematically show a wiring pattern, and thicknesses and intervals of the wirings are different from an actual situation.

As shown in FIG. 3, the row-direction wiring 21 included in the lower electrode 20 is formed of mesh-like wiring. The mesh-like wiring is made by repetition of conducting wires extending in a direction inclined at 45° with respect to the row direction, and conducting wires extending in a direction inclined at 45° in an opposite direction with respect to the row direction.

In FIG. 3, blank areas extending in the column direction from a central portion of the row-direction wiring 21 are areas where the column-direction wiring 31 is arranged in planar view. Moreover, in the central portion in FIG. 3, an area where an interval of a mesh of the row-direction wiring 21 is larger is an area where the row-direction wiring 21 overlaps the column-direction wiring 31 in planar view.

In the present embodiment, the row-direction wiring 21 has a narrow width in an intersection portion with the column-direction wiring 31. As shown in FIG. 3, the row-direction wiring 21 is made up of a first portion E1 and a second portion E2. A wiring width W2 of the second portion E2 is smaller than a wiring width W1 of the first portion. Moreover, a wiring width Wc of the column-direction wiring 31 shown in FIG. 5 is smaller than a length in the row direction M2 of the second portion E2 of the row-direction wiring 21. As shown in FIG. 6, the row-direction wiring 21 and the column-direction wiring 31 intersect around a center of the second portion E2 of the row-direction wiring 21. That is, gaps each having a width L in the row direction in planar view are provided between the row-direction wiring 21 and the column-direction wiring 31 in the intersection portion of the row-direction wiring 21 and the column-direction wiring 31. The lower electrode 20 further includes floating wiring 21a so as to fill these gaps in planar view.

The floating wiring 21a is formed of mesh-like wiring similar to the row-direction wiring 21. The floating wiring 21a is divided and insulated by disconnection portions 21c from the row-direction wiring 21 formed in the same layer. Moreover, the floating wiring 21a is also insulated from the column-direction wiring 31 formed in the different layer (the upper electrode 30).

The floating wiring 21a includes disconnection portions 21b that divide the floating wiring 21a. The disconnection portions 21b are formed so as to extend in a longitudinal direction, that is, the column direction.

FIG. 4 is an enlarged view of the area A in FIG. 3. Each of the disconnection portions 21c disconnects the floating wiring 21a from the row-direction wiring 21. Moreover, each of the disconnection portions 21b divides and disconnects the floating wiring 21a in the longitudinal direction, that is, in the column direction.

In this manner, in the intersection portion of the row-direction wiring 21 and the column-direction wiring 31, the wiring width Wc of the column-direction wiring 31 is smaller than the length in the row direction M2 of the second portion E2 of the row-direction wiring 21, by which the row-direction wiring 21 and the column-direction wiring 31 are separated by the width in the row direction L of the floating wiring 21a in planar view.

As shown in FIG. 5, the upper electrode 30 is made up of the column-direction wiring 31 and disconnection portion wiring 32. The column-direction wiring 31 is formed of mesh-like wiring similar to the row-direction wiring 21, and extends in the column direction with the wiring width Wc. In FIG. 5, an area where a mesh interval of the column-direction wiring 31 is large is an area where the column-direction wiring 31 overlaps the row-direction wiring 21 in planar view.

The row-direction wiring 21 described in FIG. 3 and the column-direction wiring 31 described in FIG. 5 intersect around the center of the second portion E2 of the row-direction wiring 21 (FIG. 6). Furthermore, the wiring width Wc of the column-direction wiring 31 is smaller than the length in the row direction M2 of the second portion E2 of the row-direction wiring 21. As shown in FIG. 6, in the intersection portion of the row-direction wiring 21 and the column-direction wiring 31, the gaps each having the width L in the row direction are formed between the row-direction wiring 21 and the column-direction wiring 31. In the gaps, the floating wiring 21a is formed.

Moreover, in FIG. 5, the disconnection portion wiring 32 is formed so as to fill the disconnection portions 21b, 21c in FIG. 4 in planar view. The provision of the disconnection portion wiring 32 prevents the disconnection portions 21b, 21c from being seen by display light passing through the disconnection portions 21b, 21c.

In FIG. 6, the vicinity of the area where the row-direction wiring 21 and the column-direction wiring 31 overlap in planar view is shown. In FIG. 6, for visibility of the figure, the disconnection portion wiring 32 is not shown.

In the area where the row-direction wiring 21 and the column-direction wiring 31 overlap in planar view, the mesh interval of each of the row-direction wiring 21 and the column-direction wiring 31 is twice as large as that in the other portions. In the portion where the row-direction wiring 21 and the column-direction wiring 31 overlap in planar view, the mesh of the row-direction wiring 21 and a mesh of the column-direction wiring 31 are complimentarily displaced and overlap. The intervals at which the meshes are displaced in the row direction and in the column direction are P1 and P2, respectively.

In this manner, the mesh interval in the area where the row-direction wiring 21 and the column-direction wiring 31 overlap in planar view is made equal to the mesh interval in the other wiring portions, by which a reflectivity of outside light at the portions where the row-direction wiring 21 and the column-direction wiring 31 intersect is uniformized to suppress the portion from being seen.

Here, when a mutual capacitance detection method is applied to the touch screen in the present embodiment, for example, the row-direction wiring 21 is a drive electrode and the column-direction wiring 31 is a reception electrode to detect the inter-wiring capacitance (mutual capacitance)

between the row-direction wiring 21 and the column-direction wiring 31 as an electric charge amount.

At this time, in a state where the column-direction wiring 31 as the reception (detection) electrode is set to a constant potential, a drive pulse voltage is applied to the row-direction wiring 21 as the drive electrode to charge the inter-wiring capacitance between the row-direction wiring 21 and the column-direction wiring 31, and then, these charged electric charges are detected in an electric charge detection circuit connected to the column-direction wiring 31. A series of operation including this charging and electric charge detection is sequentially performed in each of the row-direction wirings 21.

Here, noise that the touch screen receives from a display panel combined with the touch screen in an opposite surface of an indication body operation surface will be considered.

The electric charges detected from the column-direction wiring 31 include electric charges due to a coupling capacitance between the display panel and the column-direction wiring 31 in addition to the charged electric charges of the inter-wiring capacitance. A voltage of a display panel surface, varying with the drive of the display panel, is generally asynchronous with the detection operation of the touch screen. Thus, the electric charges charged in the coupling capacitance of the display panel and the column-direction wiring 31 become noise to the charged electric charges in the inter-wiring capacitance between the row-direction wiring 21 and the column-direction wiring 31, which is originally desired to be detected. Therefore, in order to reduce these noise electric charges and enhance a detection S/N ratio, it is effective to reduce the coupling capacitance of the display panel and the row-direction wiring 31.

However, as shown in FIG. 1, when the upper electrode 30 and the lower electrode 20 are provided on one side of the transparent substrate 10 with the interlayer insulation film 11 interposed, it is difficult in manufacturing to make a thickness of the interlayer insulation film 11 larger than about several μm. Accordingly, in order to keep the inter-wiring capacitance between the row-direction wiring 21 and the column-direction wiring 31 small, an area of the intersection portion between the row-direction wiring 21 and the column-direction wiring 31 (the portion where both the wirings overlap in planar view) needs to be small.

This disables the whole column-direction wiring 31 included in the upper electrode 30 to be covered with the row-direction wiring 21 included in the lower electrode 20, so that a portion where the column-direction wiring 31 is exposed to the display panel becomes large. Accordingly, in order to suppress the coupling capacitance of the display panel and the column-direction wiring 31 and enhance the detection S/N ratio, an exposure area of the column-direction wiring 31 to the display panel (a noise reception area from the display panel) only needs to be reduced. This can be realized, for example, by making the wiring width Wc of the column-direction wiring 31 smaller.

In the touch screen in the present embodiment, the row-direction wiring 21 included in the lower electrode 20 is made up of the first portion E1 and the second portion E2 having the wiring width W2 smaller than the wiring width W1 of the first portion E1. Moreover, the wiring width Wc of the column-direction wiring 31 included in the upper electrode 30 is smaller than the length in the row direction M2 of the second portion E2 of the row-direction wiring 21. The row-direction wiring 21 and the column-direction wiring 31 intersect in the second portion E2 of the row-direction wiring 21.

This reduces the inter-wiring capacitance between the row-direction wiring 21 and the column-direction wiring 31, and a change amount of the inter-wiring capacitance when the transparent substrate 10 is touched is increased, thereby enhancing touch detection sensitivity, and further, the wiring width Wc of the row-direction wiring 31 is made smaller to reduce the noise reception area, which can suppress influence by noise caused from the display panel.

In the present embodiment, a width of the conducting wires making up the meshes of the row-direction wiring 21 and the column-direction wiring 31 is 3 μm, and a disconnection interval of the disconnection portions is 10 μm. In the present embodiment, a thickness of the transparent substrate 10 is 0.9 mm, and the width in the row-direction L of the floating wiring 21a is 800 μm. Moreover, the interval in the row direction P1 of the mesh and the interval in the column direction P2 are 200 μm.

Simulation Result

Effects of enhancement in detection sensitivity by providing the floating wiring 21a will be described. FIG. 7 shows results from calculating the detection sensitivity by simulation when the width in the row direction of the floating wiring 21a (hereinafter, referred to as a floating wiring width L) and the thickness of the transparent substrate 10 are varied.

The detection sensitivity is a ratio between the change amount of the inter-wiring capacitance when the indication body such as a finger touches the transparent substrate 10, and the inter-wiring capacitance when there is no touch.

A detection sensitivity relative value in a vertical axis in FIG. 7 is a ratio to the detection sensitivity in the case where the floating wiring width is zero with the thickness of the transparent substrate 10 constant.

Figure 8:
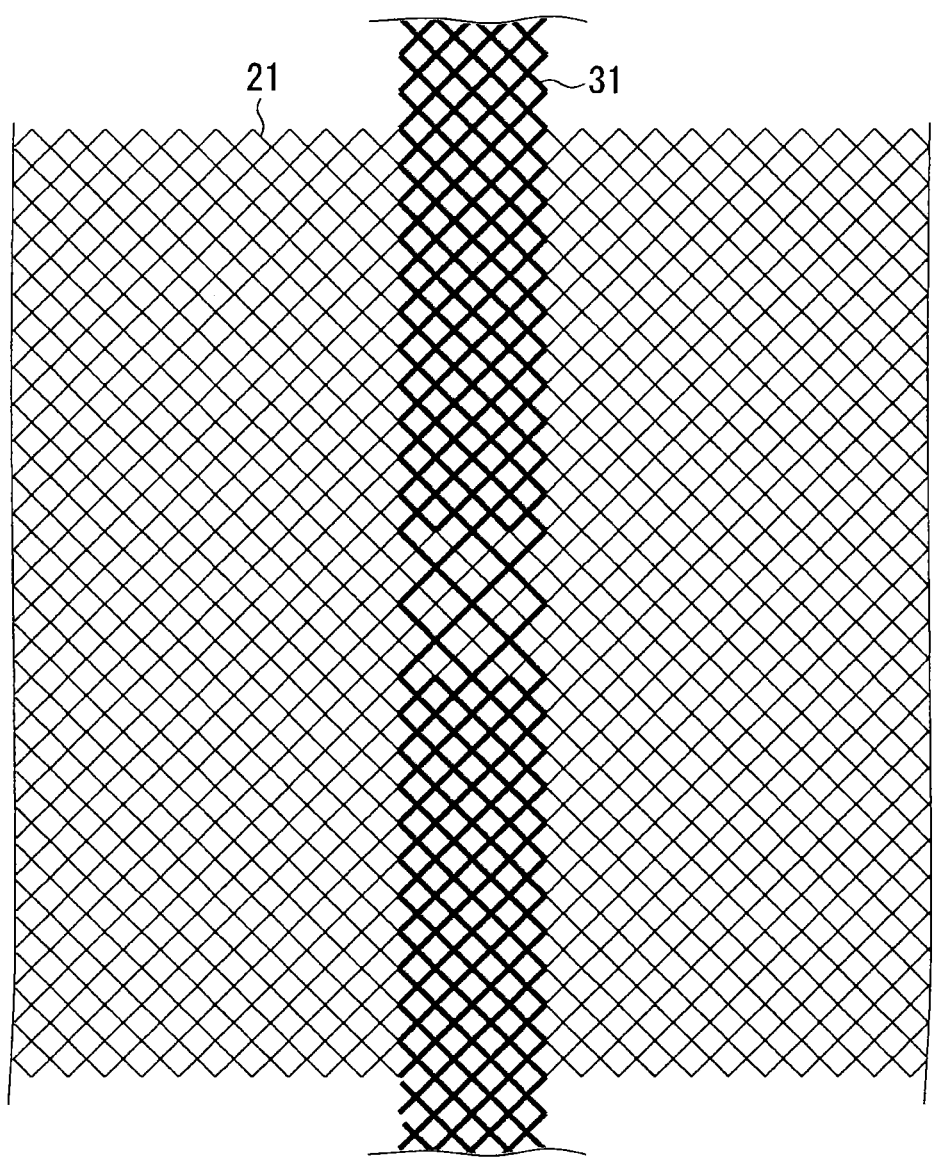
FIG. 8 is a plan view of a lower electrode and an upper electrode of a touch screen that does not include floating wiring.

That the floating wiring width L is zero means a case where as shown in FIG. 8, the row-direction wiring 21 does not include the floating portions 21a.

From FIG. 7, it is found that when the thickness of the transparent substrate 10 is constant, the detection sensitivity relative value becomes maximum at a certain value of the floating wiring width L. It is also that the floating wiring width L that gives a maximum value differs, depending on the thickness of the transparent substrate 10.

FIG. 9 shows results from examining a relationship between the thickness of the transparent substrate 10 and an optimal floating wiring width when the floating wiring width L that gives the maximum value is the optimal floating wiring width. It is found that the optimal floating wiring width is increased in proportion to the thickness of the transparent substrate 10.

In the present embodiment, the thickness of the transparent substrate 10 is 0.9 mm, and the floating wiring width L is 800 μm. Thus, from FIG. 7, it is found that as to the touch screen 1 in the present embodiment, the detection sensitivity is enhanced about twice as much as that in the case where the floating wiring 21a is not included. It is preferable to decide the floating wiring width L, based on FIG. 9.

FIG. 10 shows a relationship between a direction where the disconnection portions 21b included in the floating wiring 21a and a number of the disconnection portions 21b, and the inter-wiring capacitance. A relative value of the inter-wiring capacitance in FIG. 10 is a ratio to the inter-wiring capacitance in the case where the disconnection portion 21b is not provided in the floating wiring 21a.

In the present embodiment, the one disconnection portion 21b is provided so as to extend in a longitudinal direction of the floating wiring 21a, that is, in the column direction. From FIG. 10, it is found that in the present embodiment, the inter-wiring capacitance is reduced about to a half, as compared with the case where the disconnection portion 21b is not provided in the floating wiring 21a. Moreover, it is also found that as the number of the disconnection portions 21b is increased, the inter-wiring capacitance can be reduced more.

Moreover, from FIG. 10, it is found that when the disconnection portion 21b is provided so as to extend in a short-length direction of the floating wiring 21a, that is, in the row direction, the effect of reducing the inter-wiring capacitance is smaller than the case where it is provided so as to extend in the column direction. Thus, it is preferable that the disconnection portion 21b is provided so as to extend in the longitudinal direction of the floating wiring 21a.

As in the present embodiment, making the row-direction wiring 21 and the column-direction wiring 31 the mesh-like wiring enables the wider detectable area to be covered at a smaller wiring area. Moreover, making the row-direction wiring 21 and the column-direction wiring 31 the mesh-like wiring can reduce a parasitic capacitance of the wiring, and also suppress occurrence of a moire phenomenon.

However, a material, a conducting wire width, and the mesh interval of each of the row-direction wiring 21 and the column-direction wiring 31 are not limited to the present embodiment.

As the material of the row-direction wiring 21 and the column-direction wiring 31, a transparent conductive material such as ITO, graphene and the like, or a metal material such as aluminum, chrome, copper, silver and the like can be used. Moreover, alloys of aluminum, chrome, copper, silver or the like, or a multilayer structure in which nitride aluminum or the like is formed on any of these alloys may be employed. Moreover, the conducting wire width and the mesh interval may be set to different values from those in the present embodiment in accordance with a purpose of the touch screen or the like.

While in the present embodiment, the number of the disconnection portions 21b is one, the number can be further increased.

Moreover, while in the present embodiment, the configuration in which the floating wiring 21a is formed as the lower electrode 20, that is, the configuration in which the floating wiring 21a is formed in the same layer as the row-direction wiring 21 is employed, the floating wiring 21a may be formed as the upper electrode 30. In this case, the floating wiring 21a is formed in the same layer as the column-direction wiring 31. Even when the above-described configuration is employed, the intervals can be provided in the row direction in planar view between the row-direction wiring 21 and the column-direction wiring 31.

In order to confirm the effects of the present invention, the touch detection with a finger is conducted in a state where a mutual capacitance type detection circuit is attached to each of the touch screen 1 in the present embodiment and the touch screen having the wiring structure shown in FIG. 8. In the touch screen 1 in the present embodiment, coordinates of a touch position are detected properly. On the other hand, as for the touch screen having the wiring structure shown in FIG. 8, since the inter-wiring capacitance is large, it exceeds a dynamic range of the detection circuit, so that the coordinates of the touch position cannot be detected properly.

Effects

The touch screen 1 in the present embodiment is the touch screen 1 covered with a mesh-like wiring pattern made up of the upper and lower two layers including the row-direction wiring 21 and the column-direction wiring 31, wherein the row-direction wiring 21 is made up of the first portion E1 and the second portion E2 having the wiring width W2 smaller than the wiring width W1 of the first portion E1, the wiring width Wc of the column-direction wiring 31 is smaller than the length in the row direction M2 of the second portion E2 of the row-direction wiring 21, the row-direction wiring 21 and the column-direction wiring 31 intersect in the second portion E2 of the row-direction wiring 21, gaps are formed between the row-direction wiring 21 and the column-direction wiring 31 in planar view in the intersection portion of the row-direction wiring 21 and the column-direction wiring 31, the touch screen 1 further includes the floating wiring 21a that fills the relevant gaps in planar view, the floating wiring 21a is formed in the same layer as the row-direction wiring 21 or the column-direction wiring 31, and the floating wiring 21a is insulated from the row-direction wiring 21 and the column-direction wiring 31.

Accordingly, the row-direction wiring 21 and the column-direction wiring 31 intersect in the second portion E2 having the smaller wiring width in the row-direction wiring 21, and the wiring width Wc of the column-direction wiring 31 is smaller than the length in the row direction M2 of the second portion E2 of the row-direction wiring 21, which allow the gaps to be formed between the row-direction wiring 21 and the column-direction wiring 31 in planar view. Thus, the inter-wiring capacitance between the row-direction wiring 21 and the column-direction wiring 31 is reduced. Moreover, the wiring width Wc of the column-direction wiring 31 is made smaller than the length in the row direction M2 of the second portion E2 of the row-direction wiring 21, which makes the wiring width Wc of the column-direction wiring 31 thinner, so that the noise reception area of the column-direction wiring 31 is reduced. Thus, the change amount of the inter-wiring capacitance when the transparent substrate 10 is touched can be increased. As described above, the touch detection sensitivity can be enhanced, as compared with the case where the foregoing gaps are not provided. Furthermore, in the present embodiment, since the floating wiring 21a insulated from a periphery thereof is provided in the foregoing gaps, the effect of enhancement in the touch detection sensitivity can be obtained without degrading visibility.

Moreover, in the touch screen 1 in the present embodiment, the floating wiring 21a includes the disconnection portion 21b that divides the floating wiring 21a, and the disconnection portion 21b is formed so as to extend in the longitudinal direction of the floating wiring 21a.

Accordingly, the disconnection portion 21b is provided in the floating wiring 21a to divide the floating wiring 21a, by which the inter-wiring capacitance between the row-direction wiring 21 and the column-direction wiring 31 can be reduced more, so that the touch detection sensitivity can be further enhanced. Particularly, the disconnection portion 21b is formed so as to extend in the longitudinal direction of the floating wiring 21a, which can effectively reduce the inter-wiring capacitance.

Moreover, in the touch screen 1 in the present embodiment, the floating wiring 21a is insulated by being divided from the peripheral wiring, the disconnection portion wiring 32 that fills the divided portion (i.e., the disconnection portion 21c) and the disconnection portion 21b in planar view is further included, and the disconnection portion wiring 32 is formed in the layer where the floating wiring 21a is not formed.

Accordingly, since providing the disconnection portion wiring 32 that fills the disconnection portions 21b, 21c in planar view uniformizes the reflectivity of the outside light, the disconnection portions 21b, 21c can be suppressed from being visually recognized.

Moreover, in the touch screen 1 in the present embodiment, the mesh of the row-direction wiring 21 and the mesh of the column-direction wiring 31 are arranged so as to be complementarily displaced in planar view.

Accordingly, since in the area where the row-direction wiring 21 and the column-direction wiring 31 overlap in planar view, arranging the mesh of the row-direction wiring 21 and the mesh of the column-direction wiring 31 so as to be complementarily displaced in planar view uniformizes the reflectivity of the outside light, the intersection portion of the row-direction wiring 21 and the column-direction wiring 31 can be suppressed from being visually recognized.

Moreover, according to the touch screen 1 in the present embodiment, the floating wiring 21a insulated from the peripheral wiring is provided in a part of the row-direction wiring 21, by which the optimal intervals for the touch detection with respect to the thickness of the transparent substrate 10 can be provided between the row-direction wiring 21 and the column direction wiring 31 without degrading the visibility.

Moreover, in the touch screen 1 in the present embodiment, the mesh-like wiring is made by repetition of a unit pattern. Accordingly, since the floating wiring 21a is made by repetition of the same unit pattern as the row-direction wiring 21 and the column-direction wiring 31, the area where the floating wiring 21a is provided can be suppressed from being visually recognized.

Second Embodiment

Configuration

In the first embodiment, in the area where the row-direction wiring 21 or the column-direction wiring 31 is formed, any of the row-direction wiring 21 and the column-direction wiring 31 is provided except for the area where these wirings overlap in planar view.

Thus, since a depth of the layer where the wiring is formed is different between the row-direction wiring 21 and the column-direction wiring 31, the reflectivity is different between the row-direction wiring 21 and the column-direction wiring 31, so that the wiring is easily visually recognized.

In the present embodiment, row-direction dummy wiring 33 is further arranged in an upper electrode 30 in an upper layer of row-direction wiring 21, and column-direction dummy wiring 22 is further arranged in a lower electrode in a lower layer of column-direction wiring 31.

Furthermore, in a touch screen in the present embodiment, a mesh of the row-direction wiring 21 and a mesh of the row-direction dummy wiring 33 are complementarily displaced and overlap. Moreover, in the touch screen in the present embodiment, a mesh of the column-direction wiring 31 and a mesh of the column-direction dummy wiring 22 are complementarily displayed and overlap.

The above-described configuration can lessen a difference in reflectivity of outside light between the row-direction wiring 21 and the column-direction wiring 31 to uniformize the reflectivity.

Referring to FIGS. 11 to 15, a detailed structure of the row-direction wiring 21 and the column-direction wiring 31 of the touch screen in the present embodiment will be described.

Figure 11:
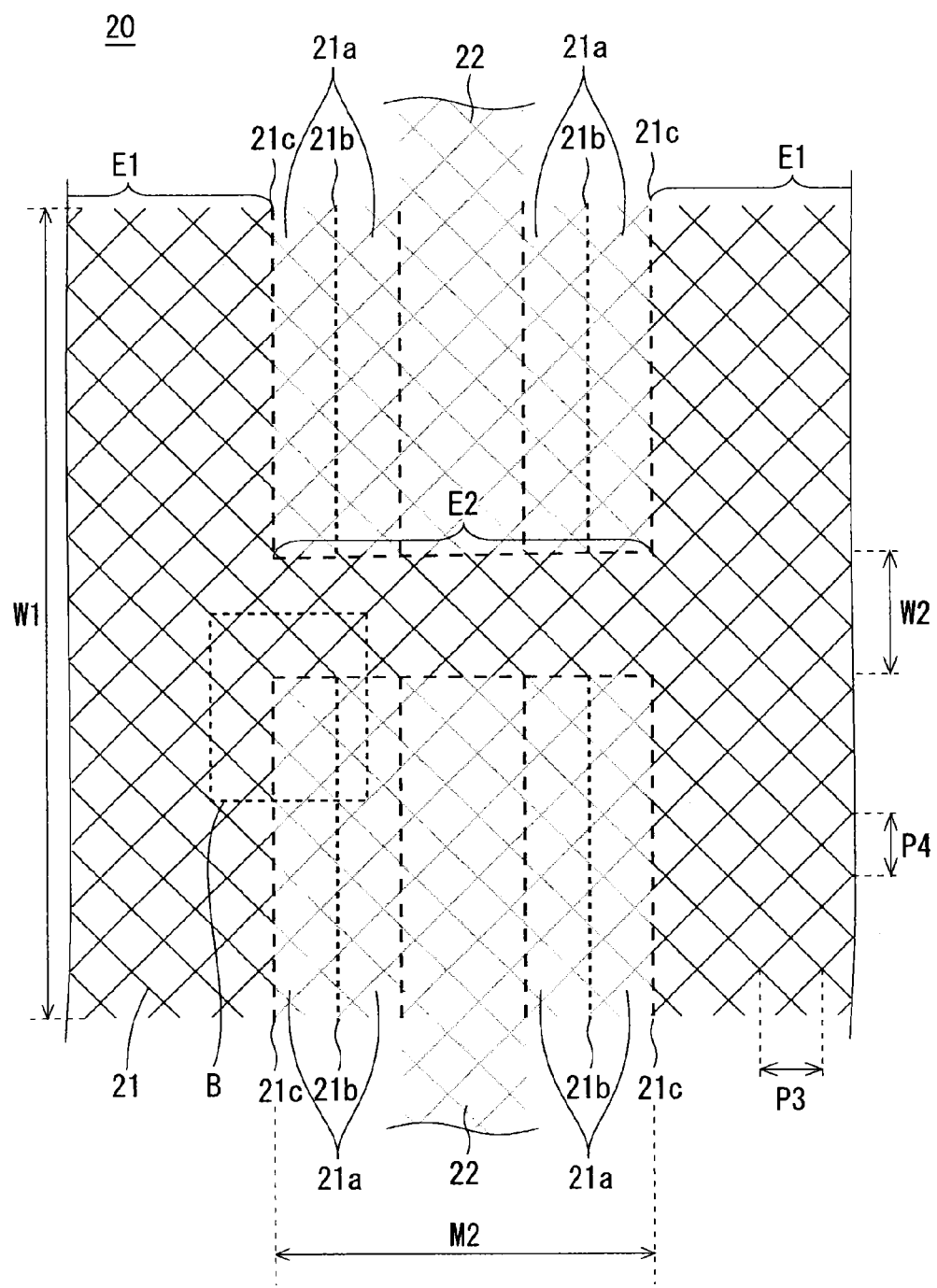
FIG. 11 is a plan view of a lower electrode of a touch screen according to a second embodiment.

FIG. 11 is a plan view of the lower electrode 20 in the vicinity of an area where the row-direction wiring 21 and the column-direction wiring 31 overlap in planar view. The lower electrode 20 is made up of the row-direction wiring 21, floating wiring 21a, and the row-direction dummy wiring 22. The row-direction dummy wiring 22 is formed in an area where the row-direction dummy wiring 22 overlaps the column-direction wiring 31 in planar view. The floating wiring 21a is similar to that in the first embodiment, and thus, a description thereof will be omitted.

The mesh interval of the row-direction wiring 21 and the column-direction dummy wiring 22 is twice as large as that of the first embodiment. That is, a column-direction interval P3 and a row-direction interval P4 are twice as large as P1, P2 in FIG. 3, respectively. The row-direction wiring 21, the floating wiring 21a, the column-direction dummy wiring 22 are mutually disconnected by disconnection portions 21c.

Figure 12:
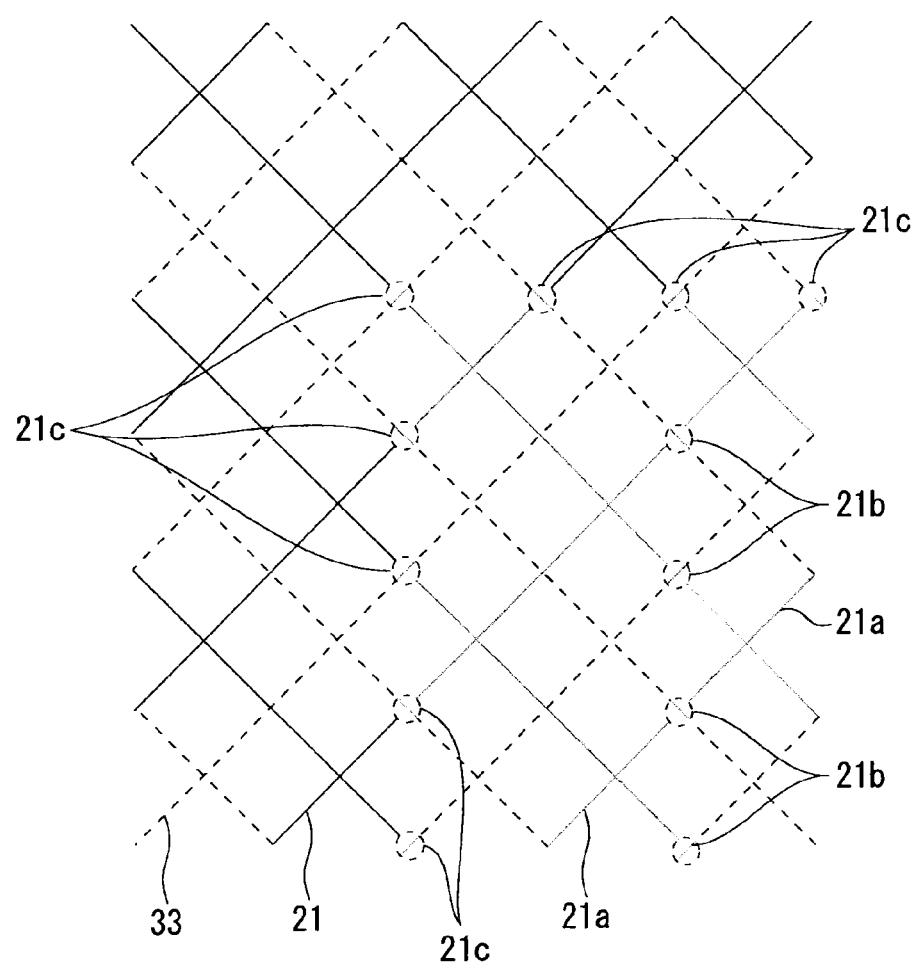
FIG. 12 is an enlarged view of an area B in FIG. 11.

FIG. 12 is an enlarged view of an area B in FIG. 11. Dashed lines in FIG. 11 indicate arrangement of the column-direction wiring 31. In FIG. 12, in respective disconnection portions 21b, 21c, conducting wires are formed so as to fill intervals of disconnection portions 33a described later of the row-direction dummy wiring 33 in planar view.

Figure 13:
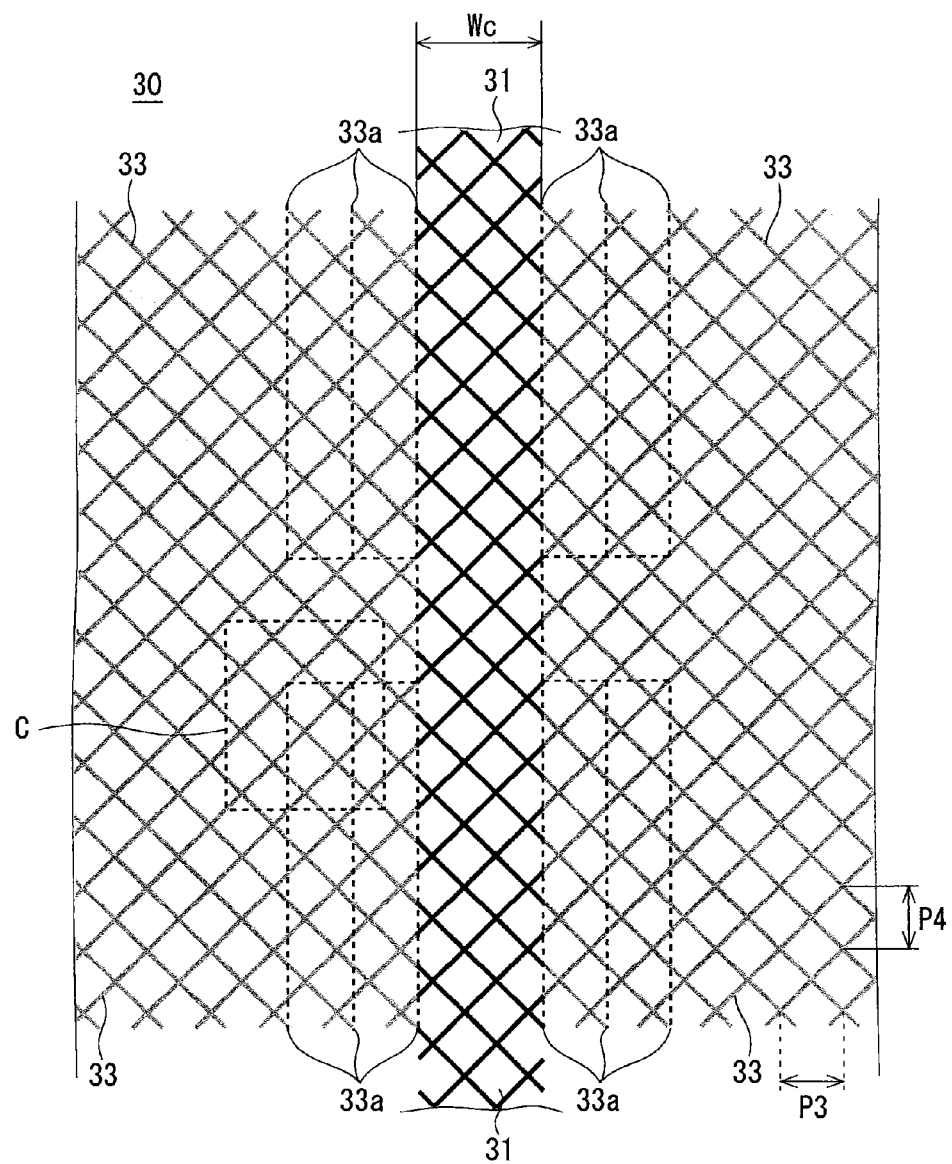
FIG. 13 is a plan view of an upper electrode of the touch screen according to the second embodiment.

FIG. 13 is a plan view of the upper electrode 30 in the vicinity of the area where the row-direction wiring 21 and the column-direction wiring 31 overlap in planar view. The upper electrode 30 is made up of the column-direction wiring 31 and the row-direction dummy wiring 33.

The row-direction dummy wiring 33 is formed in an area where it overlaps the row-direction wiring 21 and the floating wiring 21a in planar view. The column-direction wiring 31 and the row-direction dummy wiring 33 are disconnected by the disconnection portions 33a. Moreover, in the row-direction dummy wiring 33, the disconnection portions 33a are provided at positions corresponding to the disconnection portions 21b, 21c of the lower electrode 20.

The mesh interval of the column-direction wiring 31 and the row-direction dummy wiring 33 is twice as large as that in the first embodiment. That is, the column-direction interval P3 and the row-direction interval P4 are twice as large as P1, P2 in FIG. 5. The column-direction wiring 31 and the row-direction dummy wiring 33 are disconnected by the disconnection portions 33a.

FIG. 14 is an enlarged view of an area C in FIG. 13. Dashed lines in FIG. 14 indicate arrangement of the row-direction wiring 21. In FIG. 14, in the respective disconnection portions 33a, conducting wires are formed so as to fill the intervals of the disconnection portions 21b, 21c of the row-direction wiring 21 in planar view.

Figure 15:
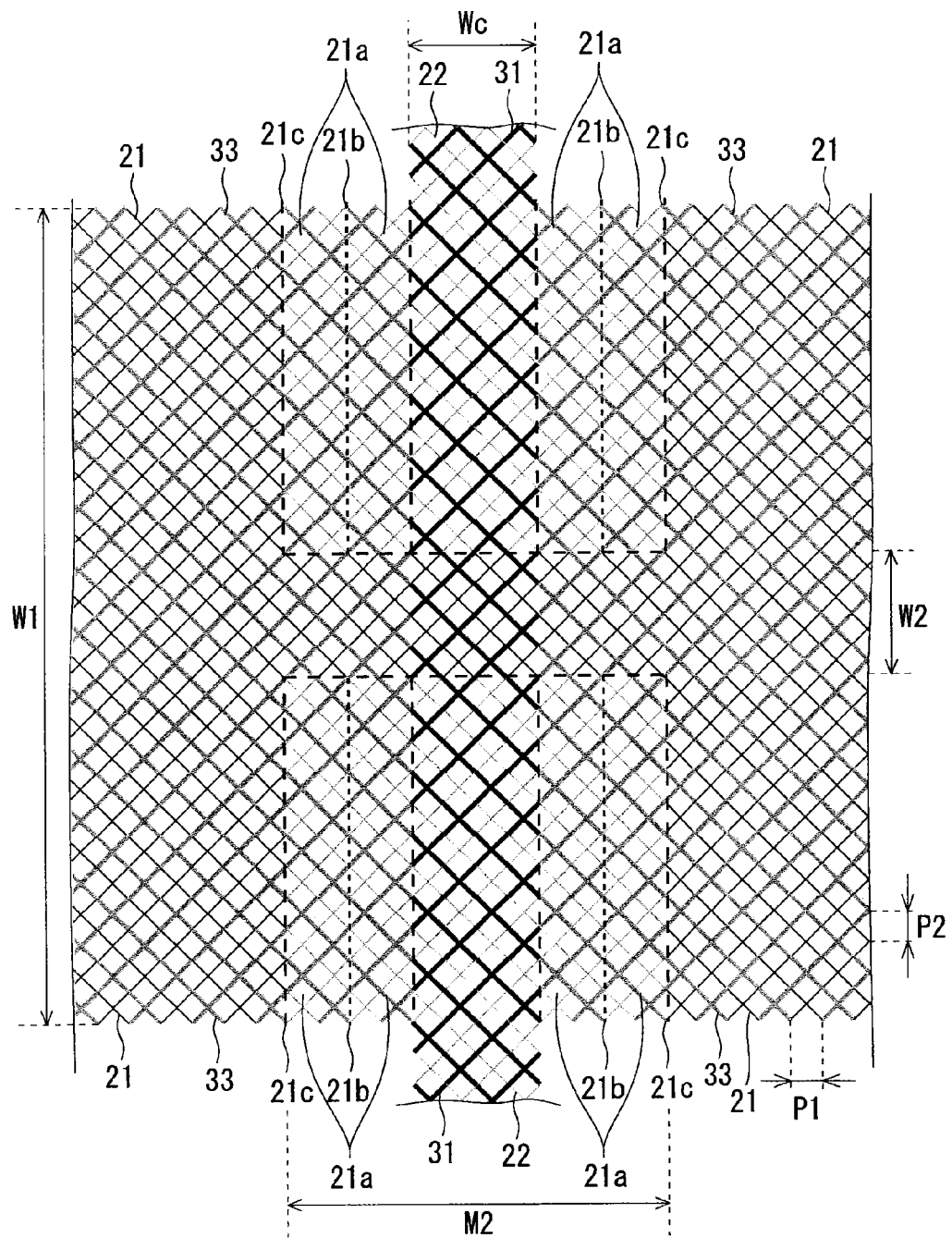
FIG. 15 is a plan view of the lower electrode and the upper electrode of the touch screen according to the second embodiment.

FIG. 15 shows a plan view of the lower electrode 20 and the upper electrode 30. As shown in FIG. 15, the row-direction dummy wiring 33 is formed in the upper electrode 30 in the upper layer of the row-direction wiring 21 formed in the lower electrode 20. Moreover, the column-direction dummy wiring 22 is formed in the lower electrode 20 in the lower layer of the column-direction wiring 31 formed in the upper electrode 30. In FIG. 15, for visibility of the figure, the disconnection portions 33a are not shown.

Moreover, the mesh of the row-direction wiring 21 and the mesh of the row-direction dummy wiring 33 are arranged so as to be complementarily displaced and overlap. Similarly, the mesh of the column-direction wiring 31 and the mesh of the column-direction dummy wiring 22 are arranged so as to be complementarily displaced and overlap.

The above-described configuration uniformizes the reflectivity in the area of the row-direction wiring 21 and the area of the column-direction wiring 31, which can suppress the area of the row-direction wiring 21 and the area of the column-direction wiring 31 from being visually recognized.

In the present embodiment, as shown in FIGS. 12 and 14, the conducting wires are arranged in the disconnection portions 21b, 21c so as to fill the disconnection intervals of the disconnection portions 33a, and the conducting wires are arranged in the disconnection portions 33a so as to fill the disconnection intervals of the disconnection portions 21b, 21c.

The above-described configuration can prevent display light from passing the connection portions 21b, 21c, 33a, when the touch screen is attached to a front surface of a display device, which preferably makes it difficult for the disconnection portions 21b, 21c, 33a to be visually recognized.

In the present embodiment, as in the first embodiment, a width of the conducting wires making up the meshes of the row-direction wiring 21 and the column-direction wiring 31 is 3 μm, and the disconnection interval of the disconnection portions 21b, 21c, 33a is 10 μm. Moreover, a thickness of a transparent substrate 10 is 0.9 mm, a width in the row direction L of the floating wiring 21a is 800 μm. The mesh intervals P3, P4 in FIGS. 11 and 13 are 400 μm, and the mesh intervals P1, P2 in FIG. 15 are 200 μm.

In order to confirm the effect of the present invention, the touch screen according to the embodiment, and the touch screen in the first embodiment are manufactured, and a mutual capacitance type detection circuit is attached to each of the touch screens to conduct touch detection with a finger. In the touch screen in the present embodiment as well, position coordinates of a touch position can be precisely detected as with the touch screen in the first embodiment.

Moreover, in order to confirm visibility, in the touch screen in the embodiment and the touch screen in the first embodiment are visually observed under an indoor illuminance of 1000 lux, and consequently, in the touch screen in the first embodiment, the lower electrode 20 and the upper electrode 30 are visually observed, while in the touch screen in the present embodiment, they are not visually observed.

Effects

In the touch screen in the present embodiment, the floating wiring 21a is formed in the same layer as the row-direction wiring 21, the touch screen further includes the mesh-like column-direction dummy wiring 22 formed in the same layer as the row-direction wiring 21 in a same area as the column-direction wiring 31 in planar view, and the mesh-like row-direction dummy wiring 33 formed in the same layer as the column-direction wiring 31 in a same area as the row-direction wiring 21 in planar view, and the mesh of the column-direction wiring 31 and the mesh of the column-direction dummy wiring 22 are arranged so as to be complementarily displaced in planar view, and the mesh of the row-direction wiring 21 and the mesh of the row-direction dummy wiring 33 are arranged so as to be complementarily displaced in planar view.

Accordingly, the row-direction dummy wiring 33 is provided in the upper layer of the row-direction wiring 21 and the floating wiring 21a, the column-direction dummy wiring 22 is provided in the lower layer of the column-direction wiring 31, and the meshes of wiring in the upper and lower layers are arranged so as to be complementarily displaced in planar view, which can lessen a difference in reflectivity of the outside light between the row-direction wiring 21 and the column-direction wiring 31 to uniformize the reflectivity.

Thus, since in addition to the effects described in the first embodiment, the reflectivity of the outside light is uniformized, the row-direction wiring 21 and the column-direction wiring 31 can be suppressed from being visually recognized.

Third Embodiment

Configuration

Configurations of a lower electrode 20 and an upper electrode 30 of a touch screen in the present embodiment are different in that the unit pattern of the wiring in the second embodiment (FIG. 15) is changed into a circular arc shape.

Figure 16:
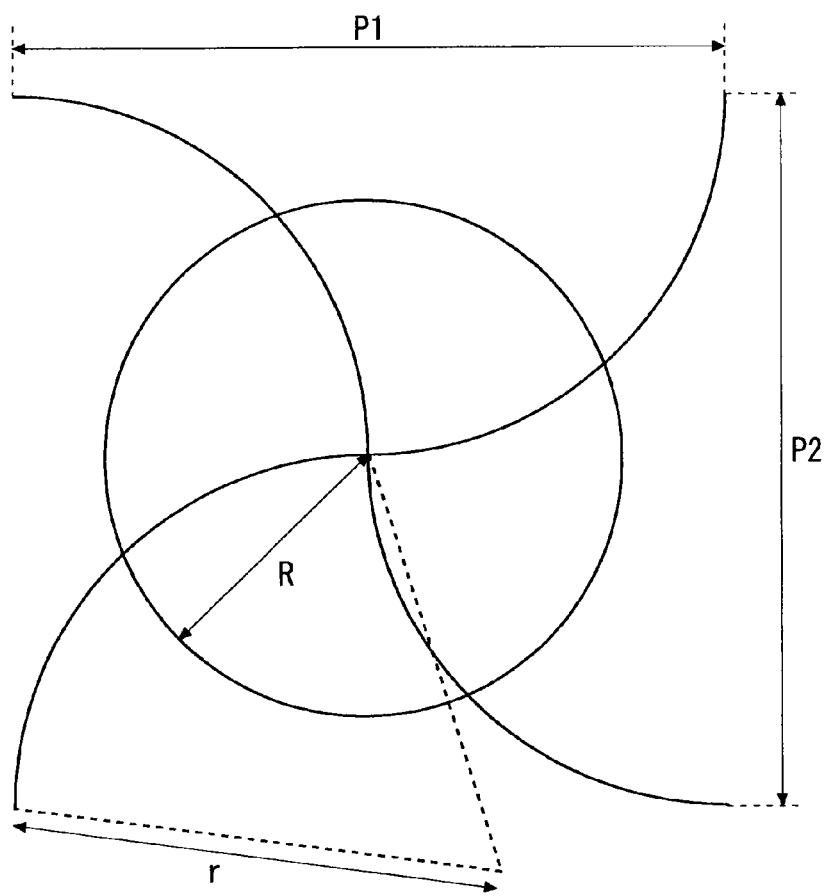
FIG. 16 is a view showing a unit pattern of wiring in a touch screen according to a third embodiment.

FIG. 16 shows a unit pattern common to row-direction wiring 21, column-direction wiring 31, row-direction dummy wiring 33, and column-direction dummy wiring 22 in the present embodiment.

The unit pattern of the wiring in the present embodiment is made up of S-shaped wirings intersecting with each other and circular wiring around an intersection of the S-shaped wirings. A radius of a circular arc making the S-shaped wiring is r, and a radius of the circular wiring is R.

An interval in a row direction P1 and an interval in a column-direction P2 of the unit pattern is 200 μm. Moreover, the radius r of the circular arc is 100 μm, and the radius R of the circular wiring is 80 μm.

Figure 17:
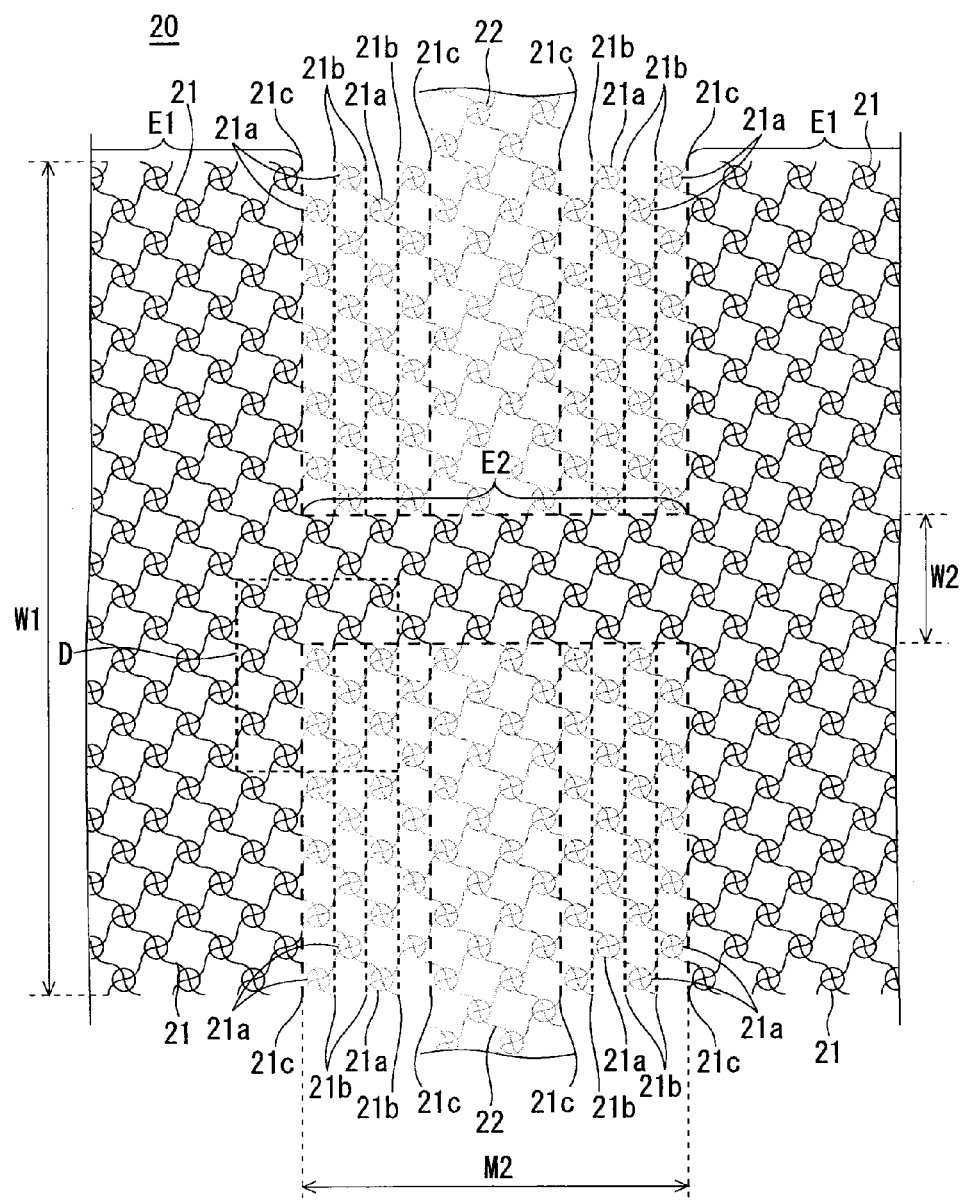
FIG. 17 is a plan view of a lower electrode of the touch screen according to the third embodiment.

FIG. 17 shows a plan view of the lower electrode 20 in the vicinity of an area where the row-direction wiring 21 and the column-direction wiring 31 overlap in planar view. In FIG. 17, the unit pattern of the wiring in FIG. 11 is replaced by the circular arc-shaped unit pattern shown in FIG. 16.

Disconnection portions 21c separate and disconnect respective areas of the row-direction wiring 21, floating wiring 21a, and the column-direction dummy wiring 22. Moreover, the floating wiring 21a is separated and disconnected in a longitudinal direction, that is, in the column direction by three disconnection portions 21b. The other configurations are the same as those in FIG. 11, and thus, descriptions will be omitted. Moreover, FIG. 18 is an enlarged view of an area D in FIG. 17.

Figure 19:
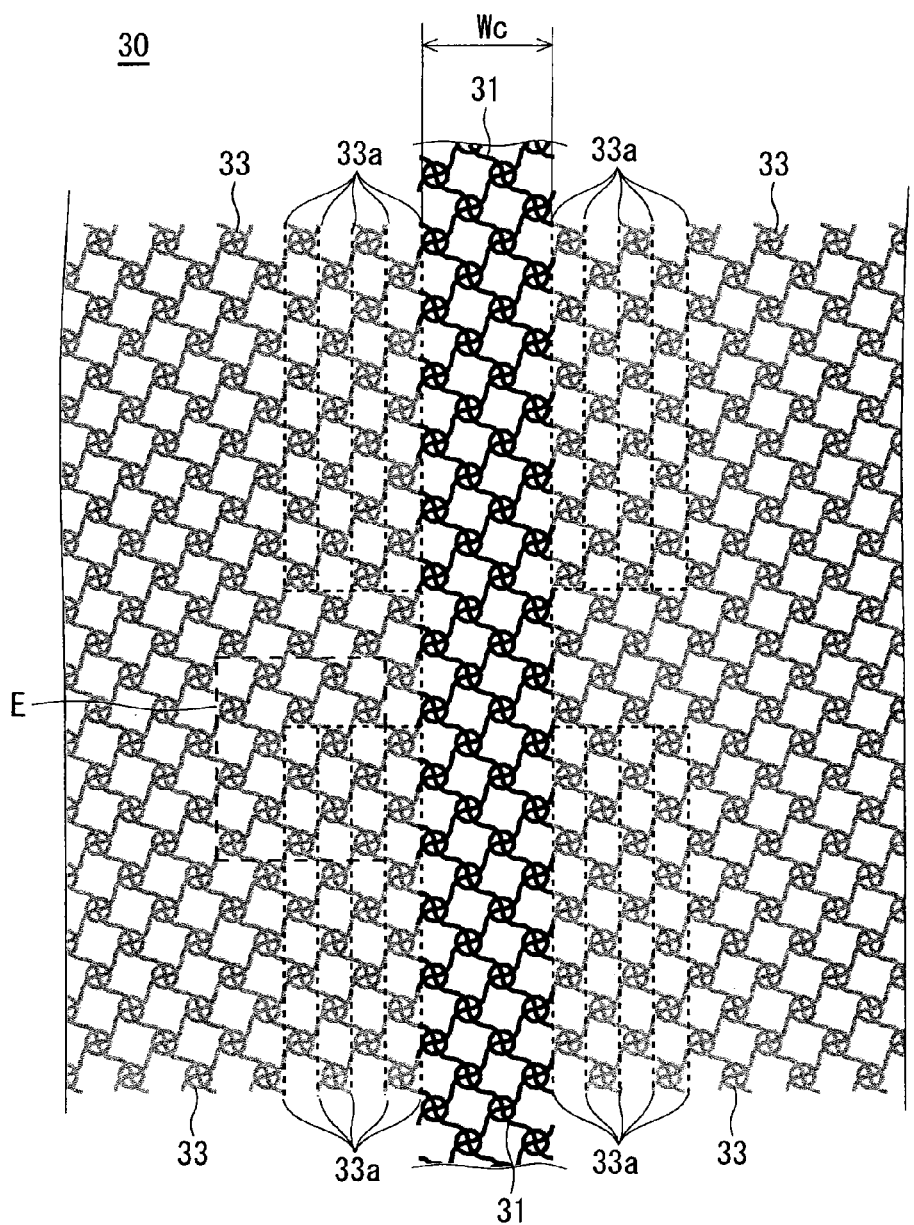
FIG. 19 is a plan view of an upper electrode of the touch screen according to the third embodiment.
Figure 20:
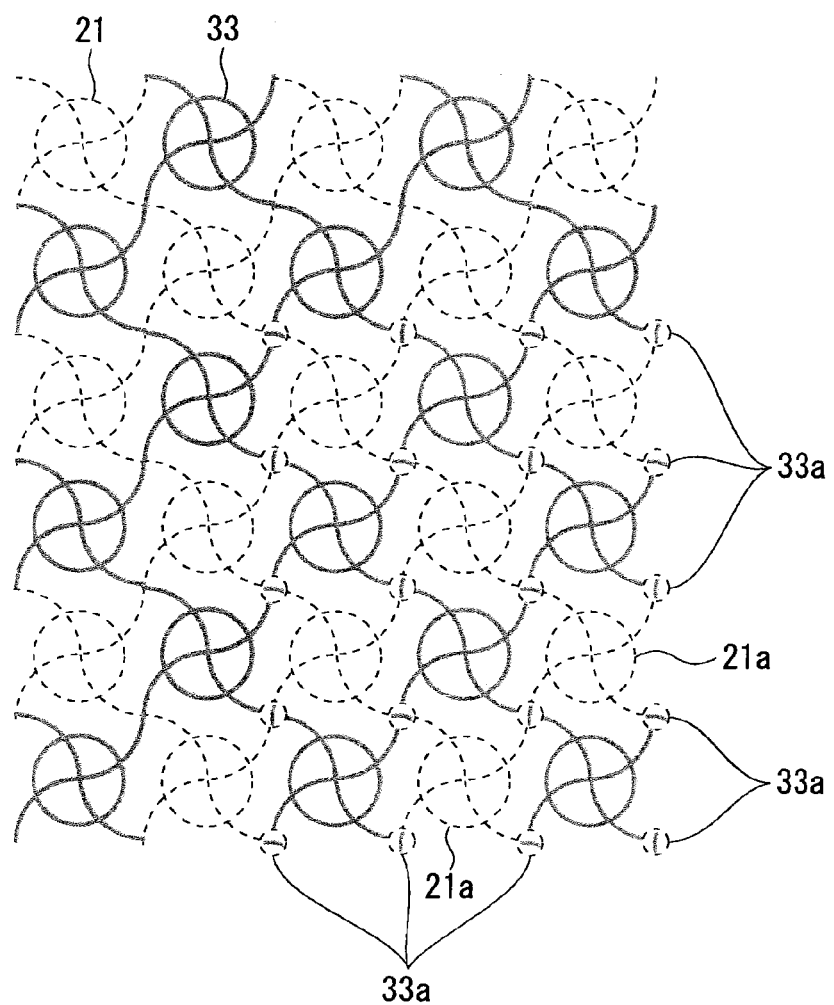
FIG. 20 is an enlarged view of an area E in FIG. 19.

FIG. 19 shows a plan view of the upper electrode 30 in the vicinity of the area where the row-direction wiring 21 and the column-direction wing 31 overlap in planar view. In FIG. 19, the unit pattern of the mesh-like wiring in FIG. 13 is replaced by the circular arc-shaped unit pattern shown in FIG. 16. The other configurations are the same as those in FIG. 13, and thus, descriptions thereof will be omitted. Moreover, FIG. 20 is an enlarged view of an area E in FIG. 19.

Figure 21:
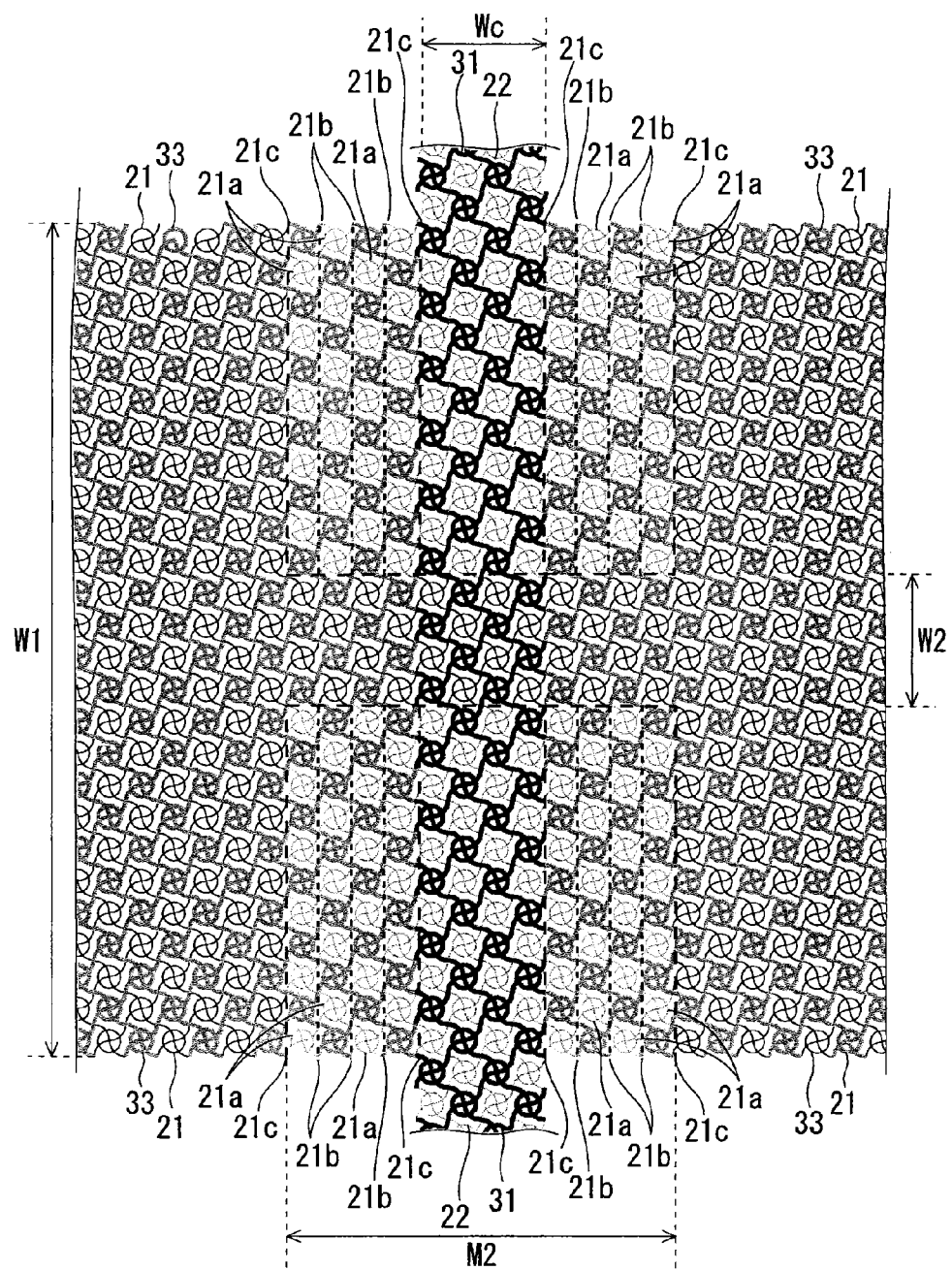
FIG. 21 is a plan view of the lower electrode and the upper electrode of the touch screen according to the third embodiment.

FIG. 21 shows a plan view of the lower electrode 20 and the upper electrode 30 in the vicinity of the area where the row-direction wiring 21 and the column-direction wiring 31 overlap in planar view. In FIG. 21, for visibility of the figure, disconnection portions 33a are omitted. FIG. 21 is a view in which the unit pattern of the wiring in FIG. 15 is replaced by the unit pattern in FIG. 16. While the number of the disconnection portions 21b dividing the floating wiring 21a in the column direction is one in FIG. 15, the number is three in FIG. 21. The other configurations are the same as those in FIG. 15, and thus, descriptions will be omitted.

In the present embodiment, a width of conducting wires making up the wiring is 3 μm, and a disconnection width of the disconnection portions 21b, 21c, 33a is 10 μm.

While in the present embodiment, the S-shaped wirings of the unit pattern are provided so as to extend in a direction inclined at 45° with respect to the row direction, and in a direction inclined at 45° in the opposite direction with respect to the row direction, they may be provided so as to extend in the row direction and the column direction.

In order to confirm the effects of the invention, the touch screen in the present embodiment and the touch screen in the second embodiment are manufactured, and a mutual capacitance type detection circuit is attached to each of the touch screens to conduct touch detection with a finger. In the touch screen in the present embodiment as well, position coordinates of a touch position can be precisely detected as with the touch screen in the second embodiment.

Moreover, in order to confirm the visibility of the touch screens, the touch screen in the present embodiment and the touch screen in the second embodiment are visually observed under direct sunshine having an illuminance of 80000 lux, and consequently, in the touch screen in the present embodiment, glittering by reflected light of the wiring is more lessened. This is because the unit pattern of the wiring is circular arc-shaped, thereby allowing the reflected light to be reflected in various directions.

Effects

In the touch screen in the present embodiment, at least part of the unit pattern of the mesh-like wiring includes the circular arc shaped wiring.

Accordingly, in addition to the effects described in the second embodiment, part of the unit pattern is made the circular arc-shaped wiring, by which outside light can be scattered in various directions, as compared with the case where the unit pattern is linear, thereby suppressing glittering by the reflection of the outside light.

Moreover, in the touch screen in the present embodiment, the mesh-like wiring is made of the unit pattern, and in the unit pattern, all the wiring is formed of the circular arc-shaped wiring.

Accordingly, shaping all the wiring into circular arcs allows the outside light to be more effectively scattered in various directions, which can further suppress the glittering by the reflection of the outside light.

Moreover, in the touch screen in the present embodiment, the mesh-like wiring is made of the unit pattern, and the unit pattern includes the S-shaped wirings intersecting with each other and the circular wiring around the intersection of the S-shaped wirings.

Accordingly, the circular wiring more effectively allows the outside light to be scattered in various directions, which can further suppress the glittering by the reflection of the outside light.

While the present invention has been described in detail, the above description is illustrative in all aspects, and the present invention is not limited thereto. It should be understood that a number of modifications not illustrated can be supposed without departing from claims.

DESCRIPTION OF REFERENCE NUMERALS 1 touch screen
8 terminal
10 transparent substrate
11 interlayer insulation film
12 protective film
20 lower electrode
21 row-direction wiring
21a floating wiring
21b, 21c, 33a disconnection portion
22 column-direction dummy wiring
30 upper electrode
31 column-direction wiring
32 disconnection portion wiring
33 row-direction dummy wiring
40 dummy lead wiring
E1 first portion
E2 second portion
W1, W2, We wiring width
M2 length in a row direction

The invention claimed is:

1. A touch screen covered with a wiring pattern made up of a first layer including row-direction wiring and a second layer including column-direction wiring,
   wherein said touch screen further comprises floating wiring formed between said row-direction wiring and said column-direction wiring in planar view in an intersection portion of said row-direction wiring and said column-direction wiring,
   said floating wiring is formed in the first layer,
   said floating wiring is insulated from said row-direction wiring and said column-direction wiring,
   said touch screen further comprises: column-direction dummy wiring formed in the first layer in a same area as said column-direction wiring in planar view; and
   row-direction dummy wiring formed in the second layer in a same area as said row-direction wiring and said floating wiring in planar view,
   a mesh of said row-direction wiring and a mesh of said column-direction wiring are arranged so as to be displaced in planar view,
   the mesh of said column-direction wiring and a mesh of said column-direction dummy wiring are arranged so as to be displaced in planar view,
   the mesh of said row-direction wiring and a mesh of said row-direction dummy wiring are arranged so as to be displaced in planar view, and
   a mesh of floating wiring and the mesh of said row-direction dummy wiring are arranged so as to be displaced in planar view,
   wherein said row-direction wiring is made up of a first portion and a second portion having a wiring width smaller than a wiring width of the first portion,
   a wiring width of said column-direction wiring is smaller than a length in a row direction of said second portion of said row-direction wiring,
   said row-direction wiring and said column-direction wiring intersect in said second portion of said row-direction wiring.

2. The touch screen according to claim 1,
   wherein said floating wiring includes a disconnection portion that divides said floating wiring, and
   said disconnection portion is formed so as to extend in a longitudinal direction of said floating wiring.

3. The touch screen according to claim 2,
   wherein said floating wiring is insulated by being divided from peripheral wiring, and
   said touch screen further comprises disconnection portion wiring that fills said divided portion and said disconnection portion in planar view, and
   said disconnection portion wiring is formed in the second layer.

4. The touch screen according to claim 1, wherein said wiring pattern is made by repeating a unit pattern.

5. The touch screen according to claim 4, wherein at least part of said unit pattern includes circular arc shaped wiring.

6. The touch screen according to claim 4, wherein in said unit pattern, all wiring is formed of circular arc-shaped wiring.

7. The touch screen according to claim 4, wherein said unit pattern includes S-shaped wirings intersecting with each other and circular wiring around an intersection of said S-shaped wirings.

* * * * *